United States Patent
Sugita et al.

(10) Patent No.: US 8,221,931 B2
(45) Date of Patent: *Jul. 17, 2012

(54) SOLID POLYMER ELECTROLYTE FUEL CELL STACK

(75) Inventors: Narutoshi Sugita, Utsunomiya (JP); Noriaki Osao, Kitasouma-gun (JP); Takeshi Ushio, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 11/906,456

(22) Filed: Oct. 2, 2007

(65) Prior Publication Data
US 2008/0085438 A1    Apr. 10, 2008

Related U.S. Application Data

(60) Division of application No. 10/616,696, filed on Jul. 9, 2003, now Pat. No. 7,297,424, which is a continuation of application No. 09/641,187, filed on Aug. 17, 2000, now Pat. No. 6,613,470.

(30) Foreign Application Priority Data

Sep. 1, 1999  (JP) .................................. 11-247790
Sep. 3, 1999  (JP) .................................. 11-249830
Jul. 27, 2000 (JP) ............................... 2000-227413

(51) Int. Cl.
*H01M 2/38* (2006.01)
*H01M 2/40* (2006.01)
*H01M 8/24* (2006.01)
*H01M 8/04* (2006.01)
*H01M 8/10* (2006.01)

(52) U.S. Cl. ..................... 429/456; 429/512; 429/483
(58) Field of Classification Search .................. 429/26, 429/34–35, 38–39, 513–514, 517, 518, 458, 429/483, 512, 456; 29/623.1–623.5
See application file for complete search history.

(56) References Cited

U.S. PATENT DOCUMENTS
4,276,355 A * 6/1981 Kothmann et al. ............. 429/26
(Continued)

FOREIGN PATENT DOCUMENTS
CA    2165085    12/1994
(Continued)

OTHER PUBLICATIONS

Japanese Office Action for Application No. 11-247790, dated Nov. 10, 2009.
(Continued)

*Primary Examiner* — Raymond Alejandro
*Assistant Examiner* — Claire L Roe
(74) *Attorney, Agent, or Firm* — Nelson Mullins Riley & Scarborough LLP; Anthony A. Laurentano

(57) ABSTRACT

A fuel gas inlet, a fuel gas outlet, an oxygen-containing gas inlet, an oxygen-containing gas outlet, and other components, which are disposed at upper and lower portions at both ends in the lateral direction, are provided in a first fuel cell stack. A plurality of cooling medium inlets, a plurality of cooling medium outlets, and other components are provided at lower portions on the long side and at upper portions on the long side respectively. A cooling medium flows from the lower portions to the upper portions through cooling medium flow passages to cool the power generation surface smoothly and reliably.

24 Claims, 19 Drawing Sheets

U.S. PATENT DOCUMENTS

| | | | |
|---|---|---|---|
| 4,708,916 A | 11/1987 | Ogawa et al. | |
| 5,338,621 A | 8/1994 | Bossel et al. | |
| 5,523,175 A * | 6/1996 | Beal et al. | 429/492 |
| 5,723,228 A * | 3/1998 | Okamoto | 429/437 |
| 5,804,326 A | 9/1998 | Chow et al. | |
| 5,994,901 A | 11/1999 | McIntyre et al. | |
| 6,048,633 A | 4/2000 | Fujii et al. | |
| 6,096,450 A * | 8/2000 | Walsh | 429/34 |
| 6,270,917 B1 | 8/2001 | Maeda et al. | |
| 6,303,245 B1 * | 10/2001 | Nelson | 429/34 |
| 6,410,178 B1 | 6/2002 | Matsukawa et al. | |
| 6,416,899 B1 | 7/2002 | Wariishi et al. | |
| 7,297,424 B2 * | 11/2007 | Sugita et al. | 429/12 |

FOREIGN PATENT DOCUMENTS

| | | |
|---|---|---|
| DE | 19743067 C2 | 7/1999 |
| DE | 19782129 T1 | 11/1999 |
| EP | 0999605 A2 | 5/2000 |
| JP | 3-121659 | 12/1991 |
| JP | 4-30079 | 2/1992 |
| JP | 5-221237 | 8/1993 |
| JP | 8-171926 | 2/1996 |
| JP | 8-506691 | 7/1996 |
| JP | 9-23728 | 1/1997 |
| JP | 10-172587 | 6/1998 |
| JP | 11-185778 | 7/1999 |
| JP | 2000-164236 | 6/2000 |
| JP | 2000-251902 | 9/2000 |
| WO | WO-98/22990 A1 | 5/1998 |
| WO | WO-00/63997 A1 | 10/2000 |

OTHER PUBLICATIONS

Japanese Office Action for Application No. 11-247790, dated Apr. 6, 2011.

* cited by examiner

APPENDIX

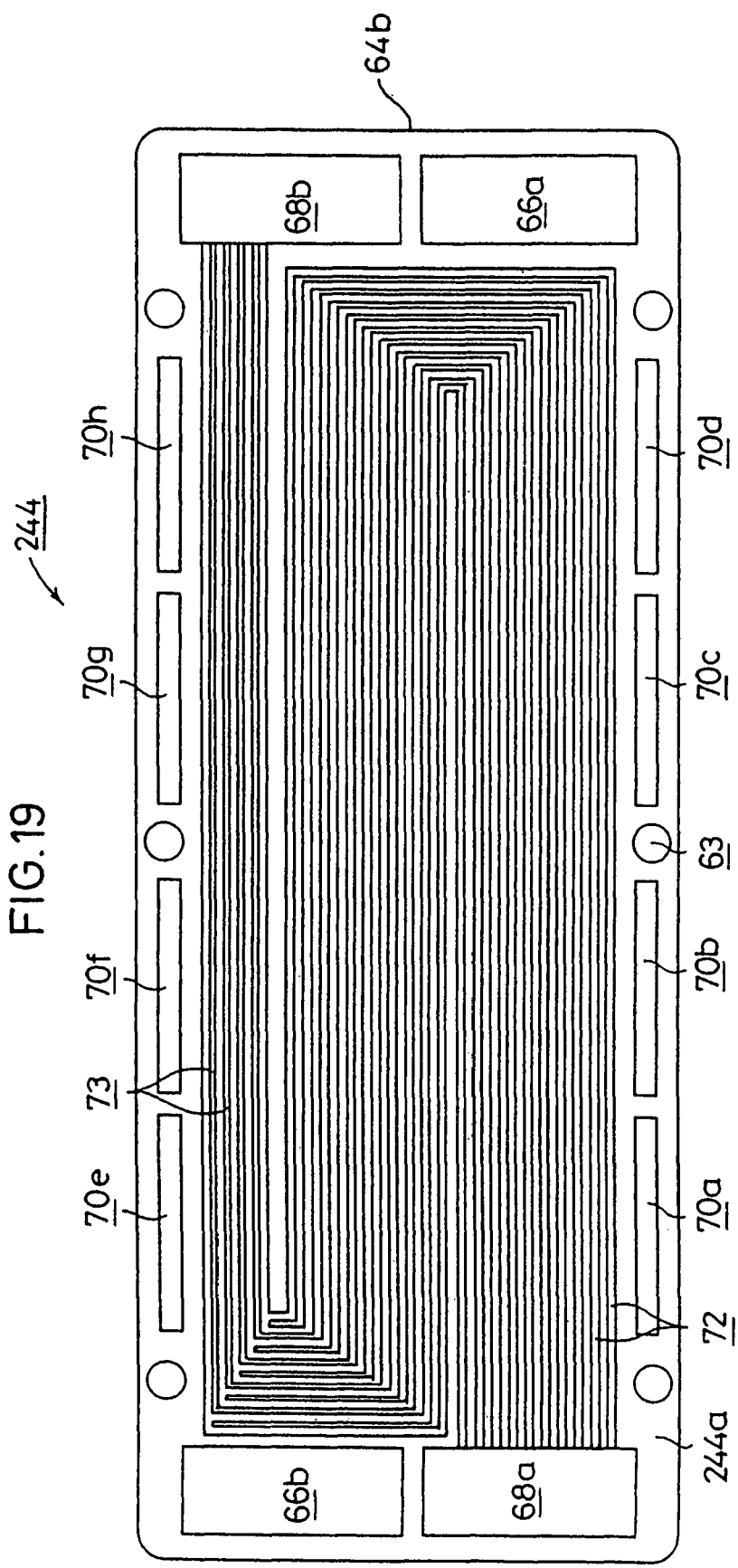

SOLID POLYMER ELECTROLYTE FUEL CELL STACK

RELATED APPLICATIONS

This application is a divisional of U.S. Ser. No. 10/616,696 filed Jul. 9, 2003 (Allowed), which is a continuation application of U.S. Ser. No. 09/641,187 filed Aug. 17, 2000 (now U.S. Pat. No. 6,613,470 B1 issued Sep. 2, 2003), which claims priority to Japanese Patent Application No. 11-247790, filed Sep. 1, 1999 in Japan, Japanese Patent Application No. 11-249830, filed Sep. 3, 1999 in Japan, and Japanese Patent Application No. 2000-227413, filed Jul. 27, 2000 in Japan. The contents of the aforementioned applications are hereby incorporated by reference.

BACKGROUND OF THE INVENTION

1. Field of the Invention

The present invention relates to a fuel cell stack comprising a plurality of fuel cell units each composed of a solid polymer ion exchange membrane interposed between an anode electrode and a cathode electrode, the plurality of fuel cell units being stacked in the horizontal direction with separators intervening therebetween.

2. Description of the Related Art

For example, the solid polymer type fuel cell comprises a fuel cell unit including an anode electrode and a cathode electrode disposed opposingly on both sides of an ion exchange membrane composed of a polymer ion exchange membrane (cation exchange membrane) respectively, the fuel cell unit being interposed between separators. Usually, the solid polymer type fuel cell is used as a fuel cell stack comprising a predetermined number of the fuel cell units and a predetermined number of the separators which are stacked with each other.

In such a fuel cell stack, a fuel gas such as a hydrogen-containing gas, which is supplied to the anode electrode, is converted into hydrogen ion on the catalyst electrode, and the ion is moved toward the cathode electrode via the ion exchange membrane which is appropriately humidified. The electron, which is generated during this process, is extracted for an external circuit, and the electron is utilized as DC electric energy. An oxygen-containing gas such as a gas containing oxygen or air is supplied to the cathode electrode. Therefore, the hydrogen ion, the electron, and the oxygen gas are reacted with each other on the cathode electrode, and thus water is produced.

When the fuel cell stack as described above is intended to be carried on a vehicle or the like, it is necessary that each of the fuel cell units is designed to have a large power generation area in order to obtain desired electric power. As a result, the entire fuel cell stack has a considerably large size. However, the appropriate place to accommodate the fuel cell stack for the vehicle is under the floor. It is desirable that the vehicle-carried type fuel cell stack is constructed to have a rectangular configuration with a horizontal length longer than a vertical length in which the dimension in the height direction is designed to be low. In view of this fact, for example, as disclosed in U.S. Pat. No. 5,804,326, a fuel cell stack is known, in which fuel cell units each having a rectangular configuration are constructed, and the plurality of fuel cell units are stacked by being interposed between separators.

However, in the case of the conventional technique described above, a reaction gas flow passage and a cooling medium flow passage are provided on an identical surface of the separator. The cooling medium flow passage interposes the reaction gas flow passage, and it extends linearly in the direction of the long side. For this reason, it is impossible to supply the cooling water to the entire power generation surface. It is feared that the power generation surface cannot be cooled efficiently.

Further, the cooling medium flow passage extends in the longitudinal direction of the rectangular separator. As a result, the following problem is pointed out. That is, the cooling medium flow passage is lengthy, the large pressure loss is generated, and the temperature distribution arises in the separator surface.

On the other hand, it is conceived that a single fuel cell stack is constructed by stacking a considerably large number of fuel cell units in order to obtain desired electric power. However, the following inconvenience arises. That is, the length of the fuel cell stack in the stacking direction is considerably lengthy, and it is impossible to uniformly supply the fuel gas to the respective fuel cell units.

In view of the above, a fuel cell system is adopted, which is constructed by preparing a plurality of fuel cell stacks and connecting the respective fuel cell stacks in series by the aid of a manifold. For example, in Japanese Laid-Open Patent Publication No. 8-171926, four stacks (fuel cell stacks) are prepared. Two of the stacks, which are arranged in two rows in the stacking direction respectively, are arranged in series by installing a supply/discharge member for the fuel and the like. The supply/discharge member for the fuel and the like is provided, at mutually opposing vertical surfaces at both ends, with holes for supplying/discharging the fuel and the like with respect to the two stacks respectively. Further, the supply/discharge member for the fuel and the like is formed with flow passages for making communication between the respective holes at the inside of the supply/discharge member for the fuel and the like.

In the conventional technique described above, the respective two stacks are juxtaposed and arranged on the both end surfaces of the supply/discharge member for the fuel and the like. A pressurizing mechanism is arranged on an end surface disposed on a side opposite to the supply/discharge member for the fuel and the like of each of the stacks so that the stacks are pressurized in the stacking direction. Further, an upper case and a lower case are installed to upper and lower portions of the stack. Therefore, the following problem is pointed out. That is, the assembling operation for the entire fuel cell is complicated, and the arrangement of the supply/discharge member for the fuel and the like is considerably complicated. The supply/discharge member for the fuel and the like has a large size and a complicated structure, and the production cost is expensive.

SUMMARY OF THE INVENTION

A general object of the present invention is to provide a fuel cell stack which makes it possible to suppress the dimension in the height direction of an entire fuel cell stack to be low, and cool the power generation surface uniformly and smoothly.

A principal object of the present invention is to provide a fuel cell system comprising two fuel cell stacks arranged in parallel, which makes it possible to simplify the piping structure for supplying and discharging fluids such as a fuel gas to the respective fuel cell stacks, and effectively suppress the dimension in the height direction of the fuel cell stack to be low.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 19 shows a front view illustrating a first surface of a second separator for constructing the fuel cell stack.

DESCRIPTION OF THE PREFERRED EMBODIMENTS

Figure 1:
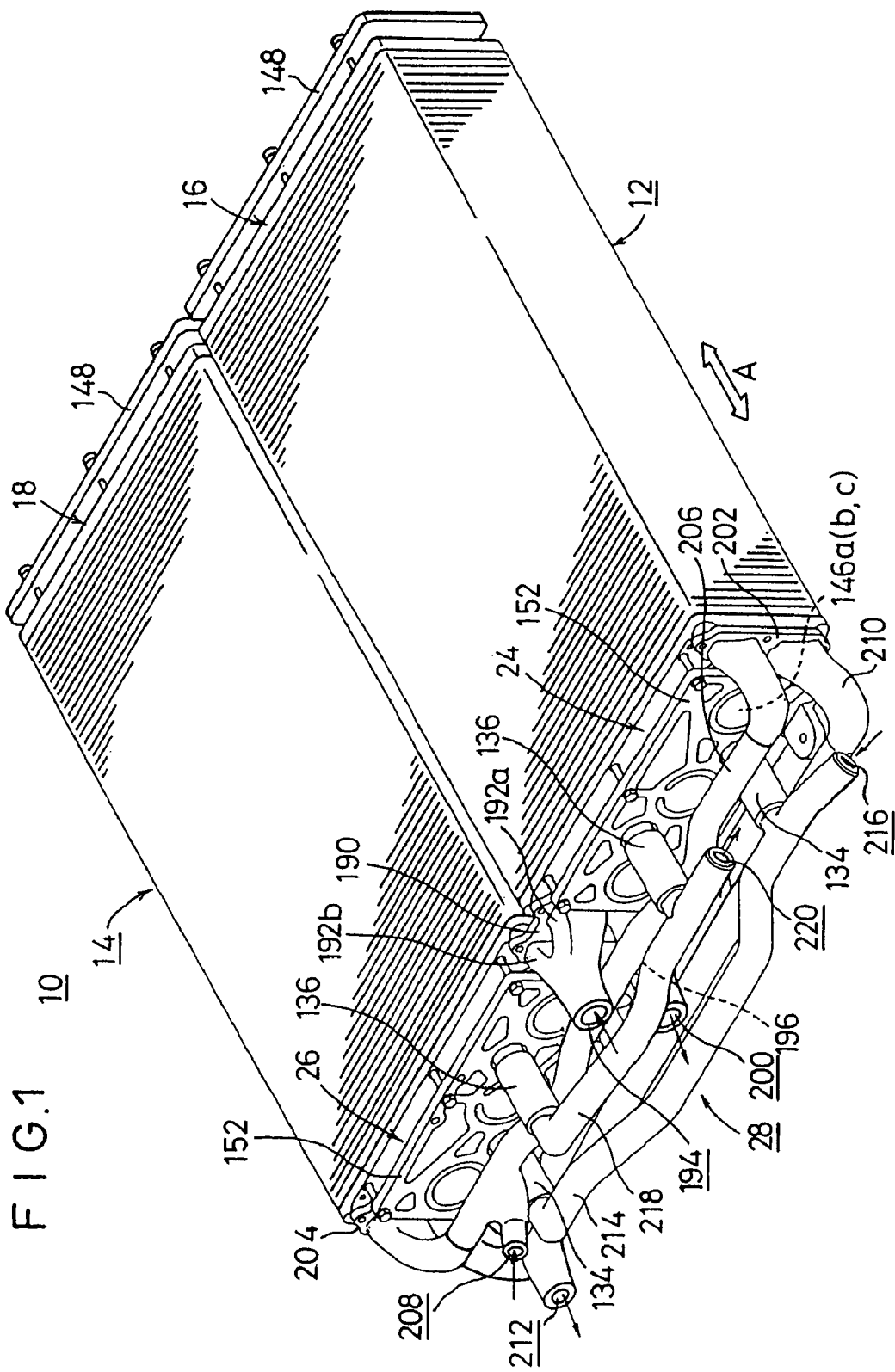
FIG. 1 shows a schematic perspective view illustrating a fuel cell system into which fuel cell stacks according to a first embodiment of the present invention is incorporated.
Figure 2:
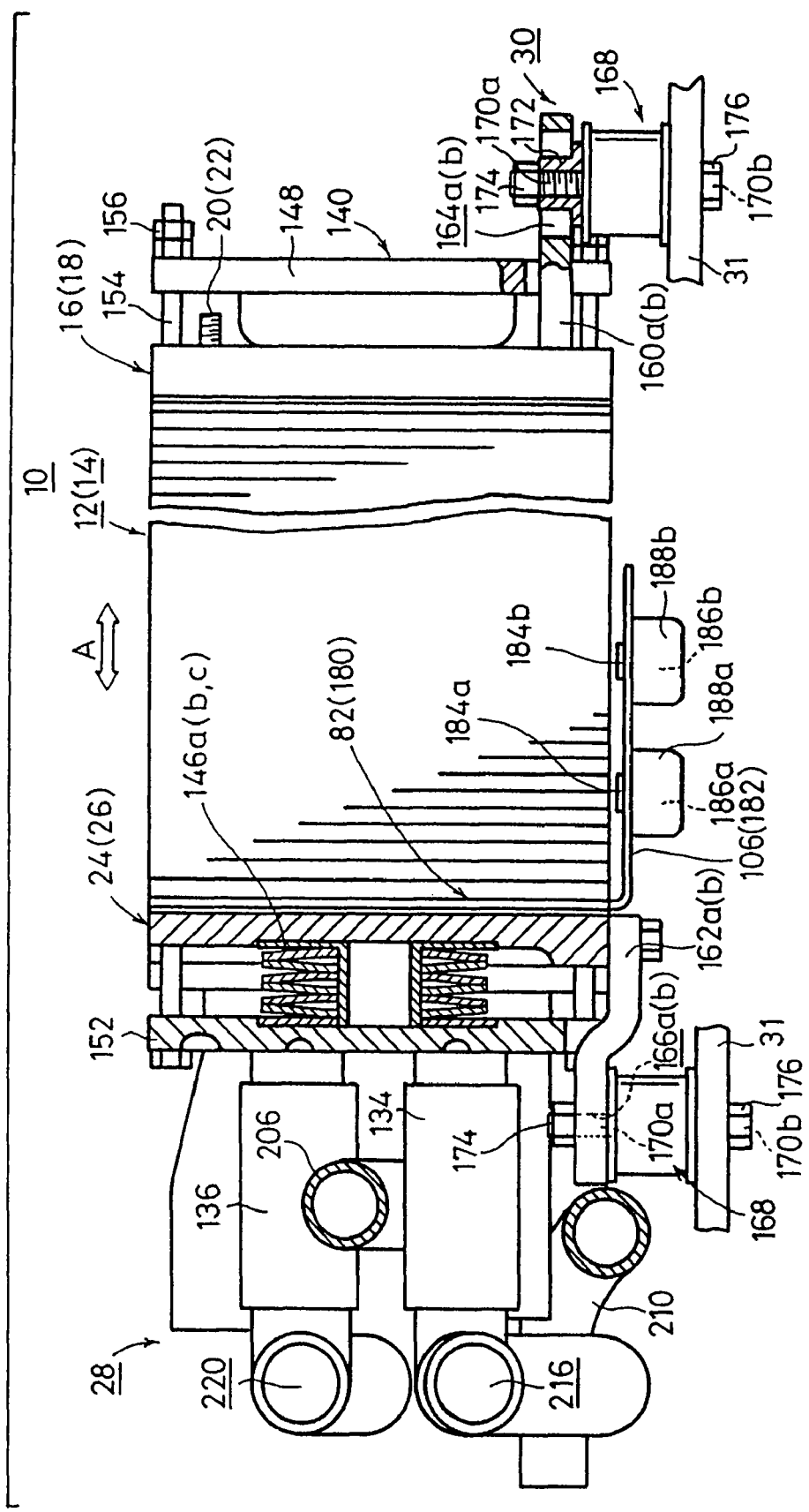
FIG. 2 shows a side view illustrating the fuel cell system.

FIG. 1 shows a schematic perspective view illustrating a fuel cell system 10 into which fuel cell stacks according to a first embodiment of the present invention is incorporated, and FIG. 2 shows a side view illustrating the fuel cell system 10.

The fuel cell system 10 comprises a first fuel cell stack 12 and a second fuel cell stack 14 which are arranged in parallel to one another in the horizontal direction (direction of the arrow A). A first electric power-deriving terminal 20 as a positive electrode, and a second electric power-deriving terminal 22 as a negative electrode are provided on first end plates 16, 18 which constitute vertical surfaces disposed at first ends on an identical side of the first and second fuel cell stacks 12, 14 respectively.

A piping mechanism 28, which is used to supply and discharge a fuel gas, an oxygen-containing gas, and a cooling medium with respect to the first and second fuel cell stacks 12, 14, is incorporated on a side of second end plates 24, 26 which constitute vertical surfaces disposed at second ends on another identical side of the first and second fuel cell stacks 12, 14 respectively. The first and second fuel cell stacks 12, 14 are fixed to an attachment plate 31 which constitutes a vehicle, by the aid of an attachment mechanism 30.

Figure 3:
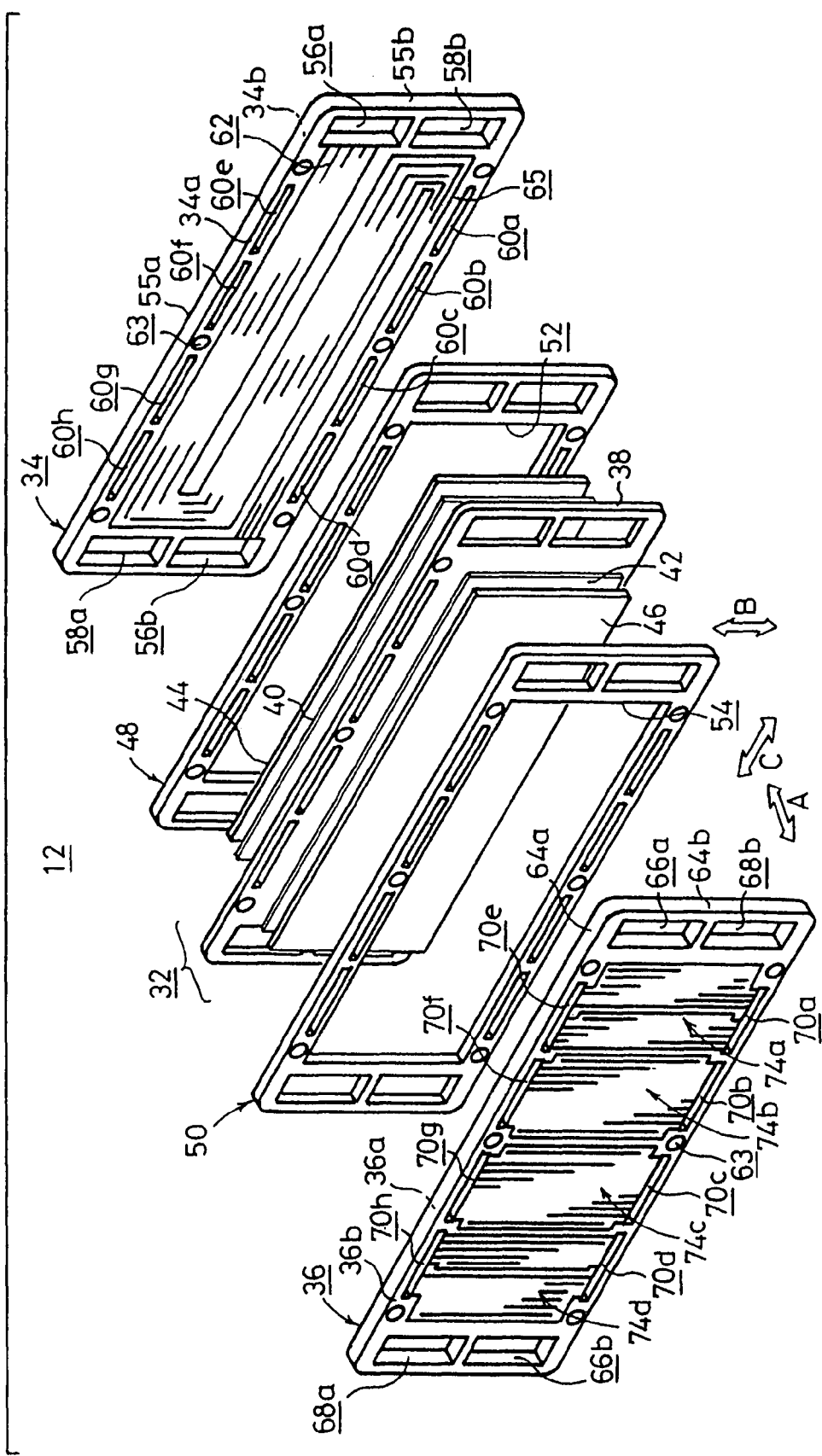
FIG. 3 shows an exploded perspective view illustrating major components of the fuel cell stack.
Figure 4:
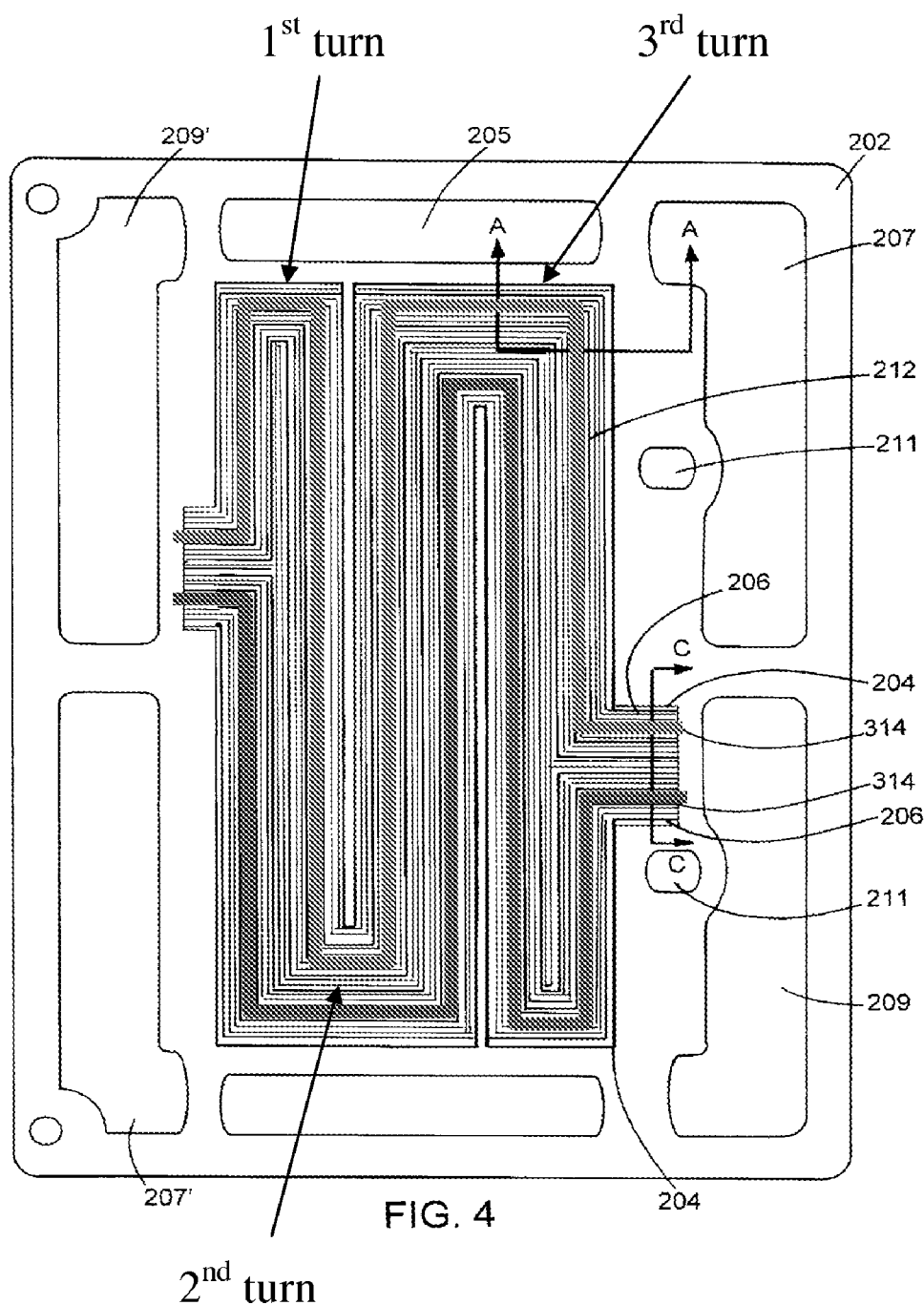
FIG. 4 shows a vertical sectional view illustrating major components of the fuel cell stack.

As shown in FIGS. 3 and 4, the first fuel cell stack 12 comprises a fuel cell unit 32, and first and second separators 34, 36 for supporting the fuel cell unit 32 interposed therebetween. A plurality of sets of these components are stacked with each other in the horizontal direction (direction of the arrow A). The first fuel cell stack 12 has a rectangular parallelepiped-shaped configuration as a whole. The first fuel cell stack 12 is arranged such that the short side direction (direction of the arrow B) is directed in the direction of the gravity, and the long side direction (direction of the arrow C) is directed in the horizontal direction.

The fuel cell unit 32 includes a solid polymer ion exchange membrane 38, and a cathode electrode 40 and an anode electrode 42 which are arranged with the ion exchange membrane 38 intervening therebetween. First and second gas diffusion layers 44, 46, each of which is composed of, for example, porous carbon paper as a porous layer, are arranged for the cathode electrode 40 and the anode electrode 42.

First and second gaskets 48, 50 are provided on both sides of the fuel cell unit 32. The first gasket 48 has a large opening 52 for accommodating the cathode electrode 40 and the first gas diffusion layer 44. The second gasket 50 has a large opening 54 for accommodating the anode electrode 42 and the second gas diffusion layer 46. The fuel cell unit 32 and the first and second gaskets 48, 50 are interposed between the first and second separators 34, 36.

The first separator 34 is designed such that each of the surface 34a opposed to the cathode electrode 40 and the surface 34b disposed on the opposite side has a rectangular configuration. For example, the first separator 34 is arranged such that the long side 55a is directed in the horizontal direction, and the short side 55b is directed in the direction of the gravity.

An oxygen-containing gas inlet (oxygen-containing gas supply port) 56a for allowing the oxygen-containing gas such as a gas containing oxygen or air to pass therethrough, and a fuel gas inlet 58a for allowing the fuel gas such as a hydrogen-containing gas to pass therethrough, each of which has a lengthy shape in the vertical direction, are provided at upper portions of the both end edges of the short sides 55b of the first separator 34 respectively. An oxygen-containing gas outlet (oxygen-containing gas discharge port) 56b and a fuel gas outlet 58b, each of which has a lengthy shape in the vertical direction, are provided so that they are disposed at diagonal positions with respect to the oxygen-containing gas inlet 56a and the fuel gas inlet 58a at lower portions of the both end edges of the shorts sides 55b of the first separator 34 respectively.

Four cooling medium inlets 60a to 60d, which are lengthy in the direction of the arrow C, are provided at lower end portions of the long side 55a of the first separator 34. Similarly, four cooling medium outlets 60e to 60h, which are lengthy in the direction of the arrow C, are provided at upper portions on the long side 55a of the first separator 34. The cooling medium such as pure water, ethylene glycol, and oil is supplied to the cooling medium inlets 60a to 60d.

Ten first oxygen-containing gas flow passage grooves 62, which communicate with the oxygen-containing gas inlet 56a and which are independent from each other, are provided in the direction of the gravity while making turns on the short side 55b and meandering in the horizontal direction on the surface 34a of the first separator 34. The first oxygen-containing gas flow passage grooves 62 are merged into five second oxygen-containing gas flow passage grooves 65. The second oxygen-containing gas flow passage grooves 65 communicate with the oxygen-containing gas outlet 56b. Holes 63 for inserting tie rods therethrough are formed at six portions of the first separator 34.

The second separator 36 is formed to have a rectangular configuration. An oxygen-containing gas inlet 66a and a fuel gas inlet (fuel gas supply port) 68a are formed to penetrate through upper portions of the both end edges on the short side 64b of the second separator 36 respectively. An oxygen-containing gas outlet 66b and a fuel gas outlet (fuel gas discharge port) 68b are formed to penetrate through lower portions of the both end edges thereof so that they are disposed at diagonal positions with respect to the oxygen-containing gas inlet 66a and the fuel gas inlet 68a respectively.

Four cooling medium inlets 70a to 70d, which are lengthy in the direction of the arrow C, are formed to penetrate through lower portions on the long side 64a of the second separator 36. Similarly, cooling medium outlets 70e to 70h, which are lengthy in the direction of the arrow C, are formed to penetrate through upper portions on the long side 64a.

Figure 5:
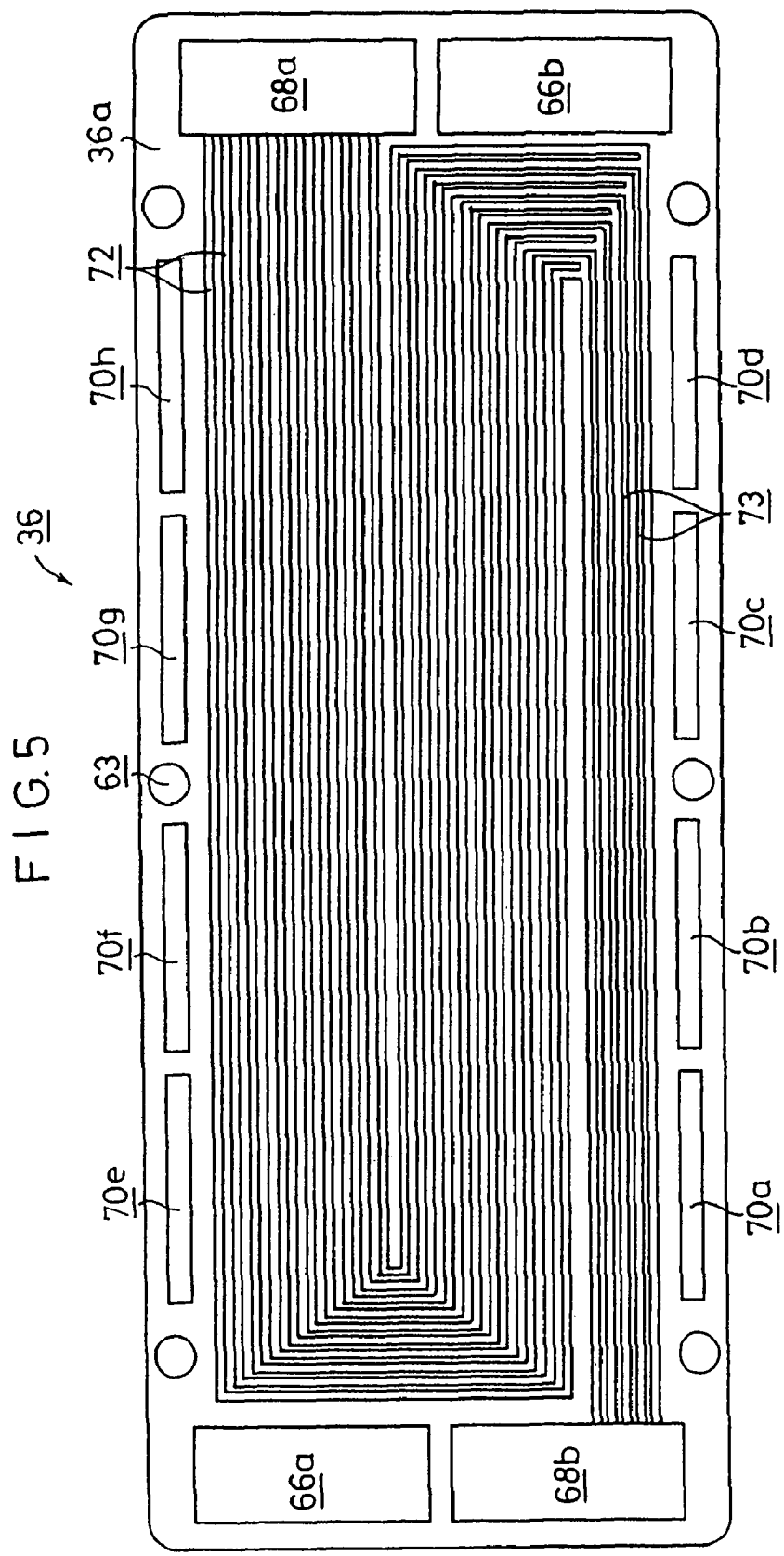
FIG. 5 shows a front view illustrating a first surface of a second separator for constructing the fuel cell stack.

As shown in FIG. 5, ten first fuel gas flow passage grooves 72, which communicate with the fuel gas inlet 68a, are formed on the surface 36a of the second separator 36. The first fuel gas flow passage grooves 72 are provided in the direction of the gravity while making turns on the short side 64b and meandering in the horizontal direction. The first fuel gas flow passage grooves 72 are merged into five second fuel gas flow passage grooves 73. The second fuel gas flow passage grooves 73 communicate with the fuel gas outlet 68b.

Figure 6:
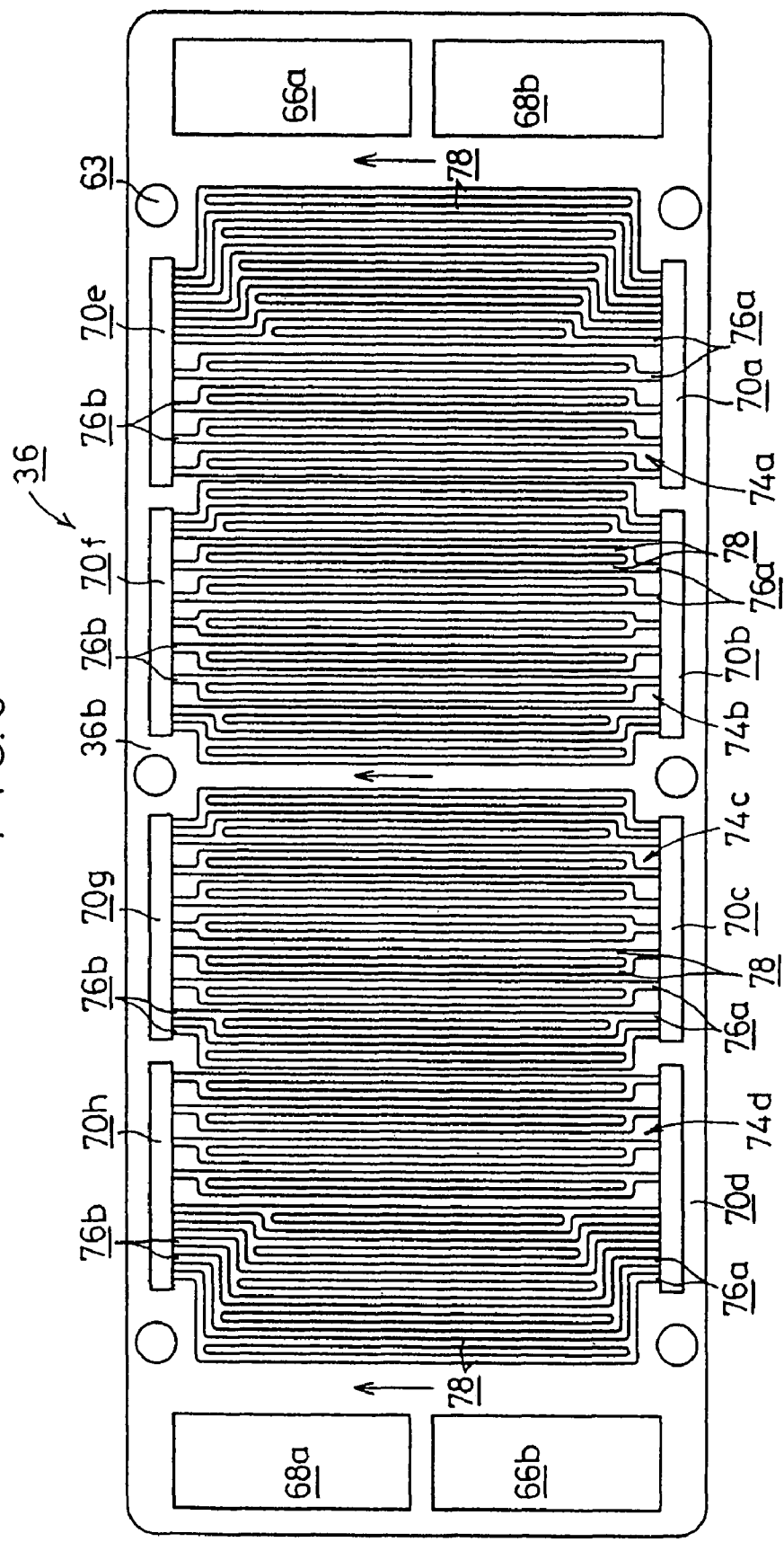
FIG. 6 shows a front view illustrating a second surface of the second separator.

As shown in FIG. 6, cooling medium flow passages 74a to 74d, which individually communicate with the cooling medium inlets (cooling medium supply ports) 70a to 70d and the cooling medium outlets (cooling medium discharge ports) 70e to 70h respectively, are provided in the direction of the gravity on the surface 36b disposed on the side opposite, to the surface 36a of the second separator 36. Each of the cooling medium flow passages 74a to 74d is provided with nine first flow passage grooves 76a, 76b which communicate with the cooling medium inlet 70a to 70d and the cooling medium outlet 70e to 70h. Two second flow passage grooves 78, which are parallel to one another in the direction of the gravity and which are separated from each other by predetermined spacing distances, are provided between each of the first flow passage grooves 76a, 76b.

In the second separator 36, holes 63 for inserting tie rods therethrough are provided at six portions in the same manner as the first separator 34. The holes 63 are provided through the first and second separators 34, 36 corresponding to the spaces between the cooling medium inlets 60a to 60d, 70a to 70d and between the cooling medium outlets 60e to 60h, 70e to 70h.

Figure 7:
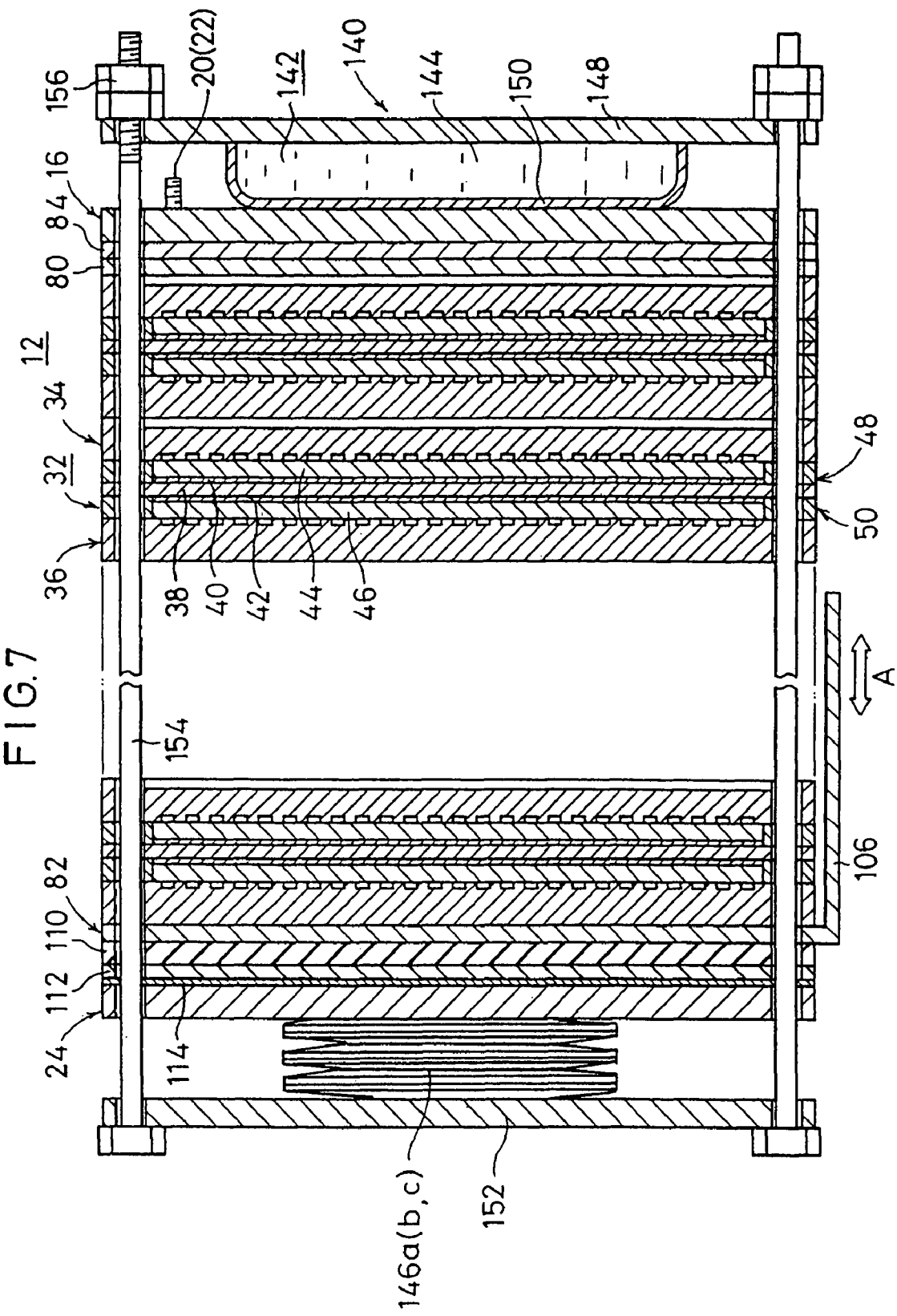
FIG. 7 shows a schematic vertical sectional view illustrating the fuel cell stack.

As shown in FIG. 7, a terminal plate 80 and a first conductive plate 82, which serve as terminal plates, are arranged at both ends in the stacking direction of the fuel cell units 32 which are stacked as a predetermined number of individuals. A first end plate 16 is stacked on the terminal plate 80 with an insulating plate 84 intervening therebetween. A first electric power-deriving terminal 20 is installed to the terminal plate 80.

Figure 8:
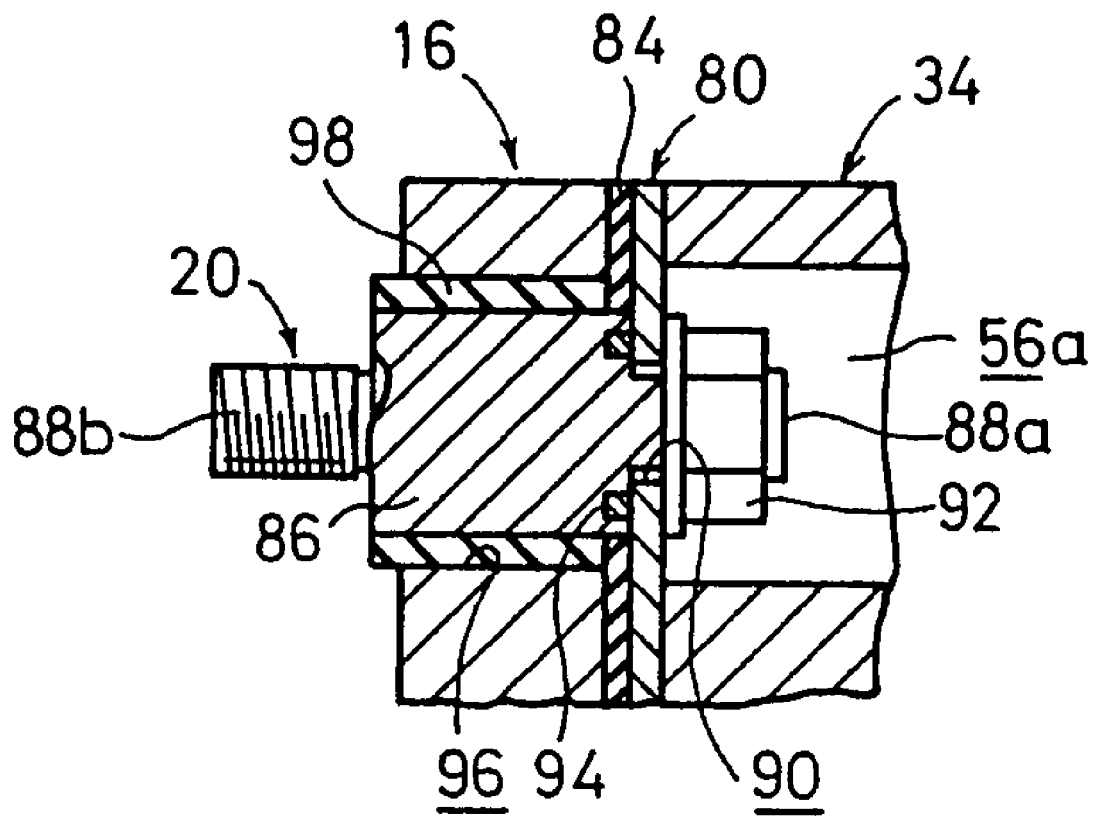
FIG. 8 illustrates a connection structure of an electric power-deriving terminal for constructing the fuel cell stack.

As shown in FIG. 8, the first electric power-deriving terminal 20 includes screw sections 88a, 88b having a small diameter provided at both ends of a columnar large diameter section 86. The screw section 88a passes through a hole 90 formed through the terminal plate 80, and it protrudes into the inside of the oxygen-containing gas inlet 56a of the first separator 34. A nut member 92 is screwed to the screw section 88a. A seal member 94 for improving the sealing performance with respect to the terminal plate 80 is installed on a shoulder of the large diameter section 86. An insulating ring 98 is installed between the outer circumference of the large diameter section 86 and the hole 96 formed through the first end plate 16.

Figure 9:
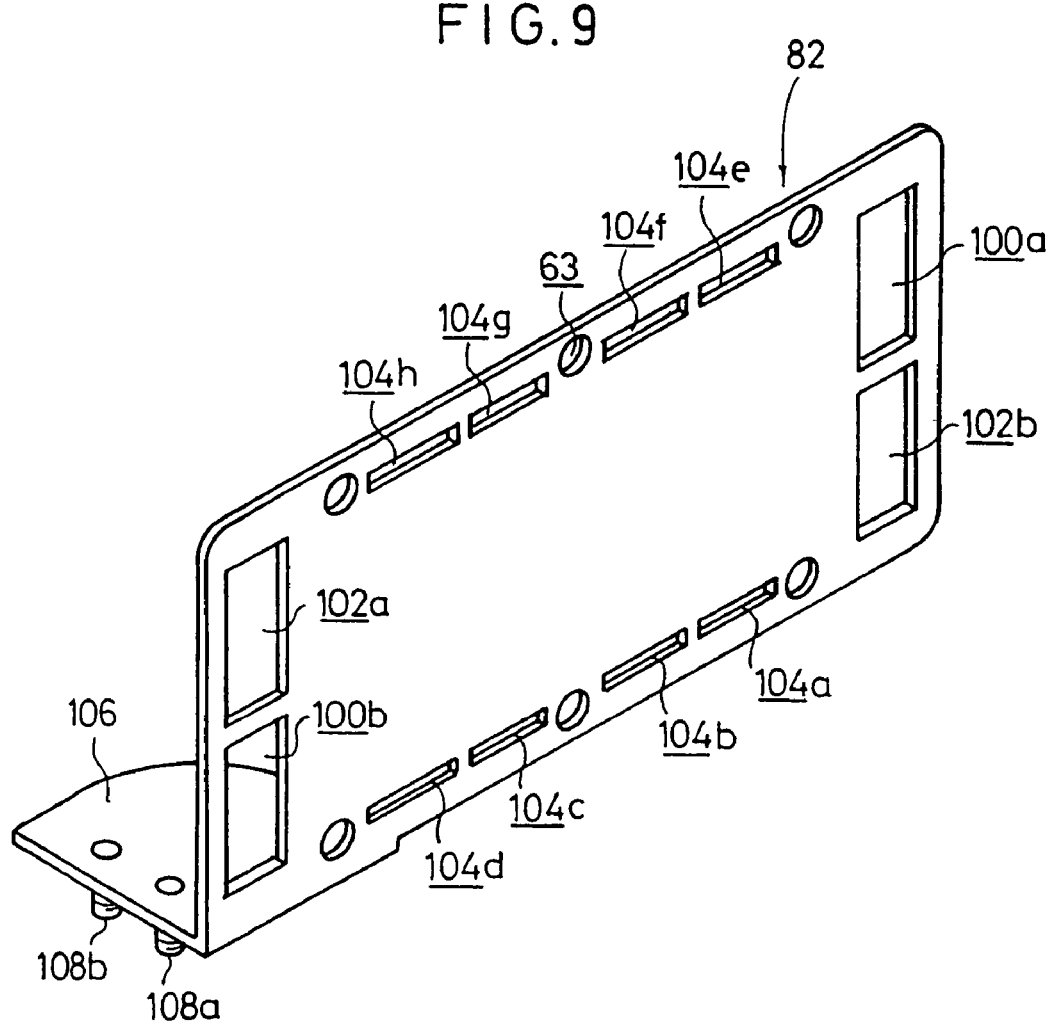
FIG. 9 shows a perspective view illustrating a conductive plate for constructing the fuel cell stack.

As shown in FIG. 9, the first conductive plate 82 is designed to have approximately the same shape as that of the second separator 36, i.e., have a rectangular configuration. An oxygen-containing gas inlet 100a, a fuel gas inlet 102a, an oxygen-containing gas outlet 100b, and a fuel gas outlet 102b are provided at mutually diagonal positions respectively at both end edge portions on the short side. Four cooling medium inlets 104a to 10d and four cooling medium outlets 104e to 104h are provided at lower and upper portions on the long side of the first conductive plate 82 respectively. Holes 63 for inserting tie rods therethrough are formed at six positions corresponding to the spaces therebetween.

A first connecting plate section 106, which is disposed under the first fuel cell stack 12 and which extends closely to the second fuel cell stack 14, is provided for the first conductive plate 82. Two bolt sections 108a, 108b, which protrude downwardly, are provided for the first connecting plate section 106. Each of the bolt sections 108a, 108b and the first conductive plate 82 is composed of a material having conductivity, for example, stainless steel or copper. As shown in FIG. 7, a second end plate 24 is stacked over the first conductive plate 82 with an insulating plate 110, a lid plate 112, and a seal member 114 intervening therebetween.

Figure 10:
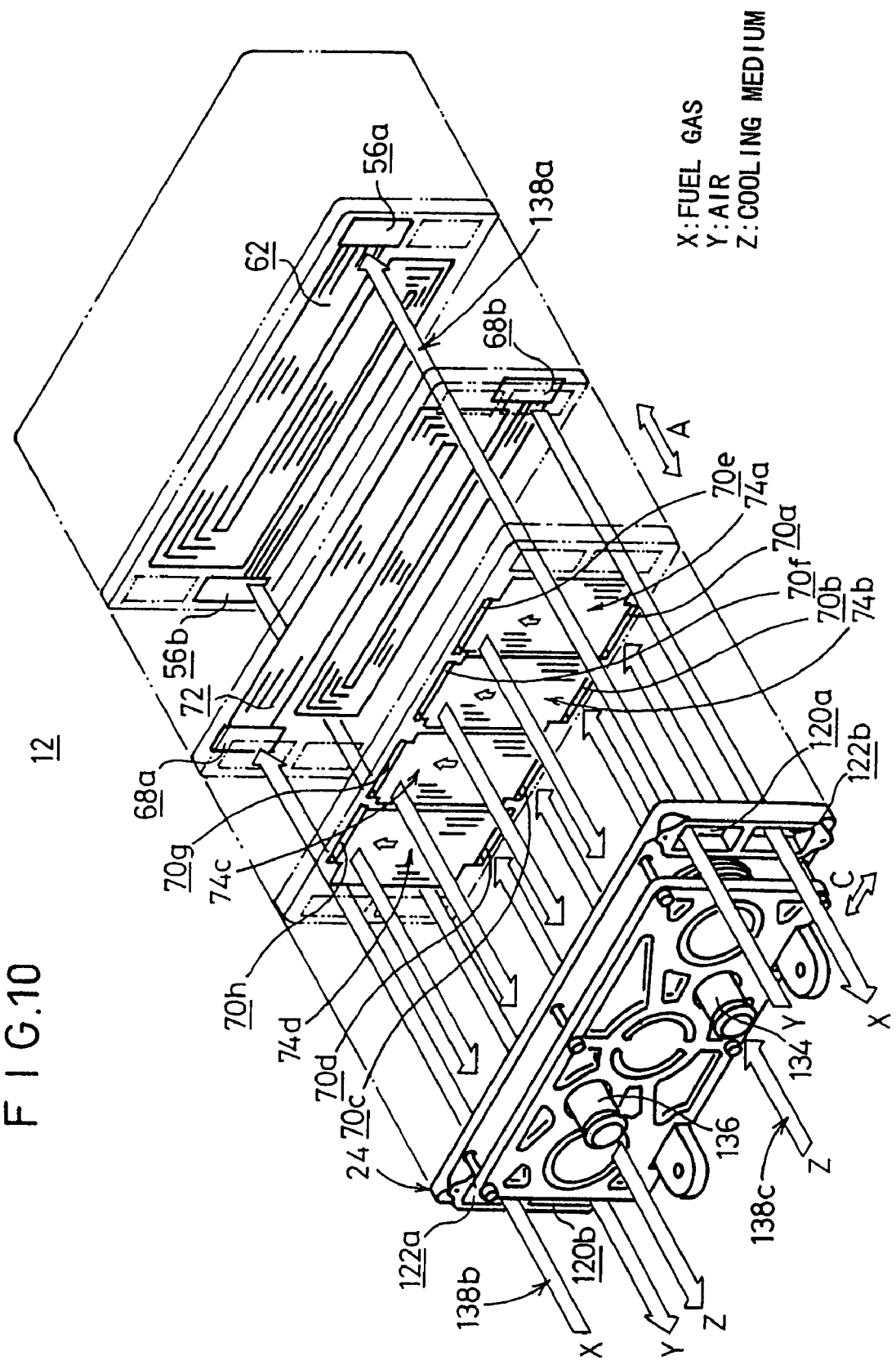
FIG. 10 illustrates flow passages depicting the flows of fluids in the fuel cell stack.
Figure 11:
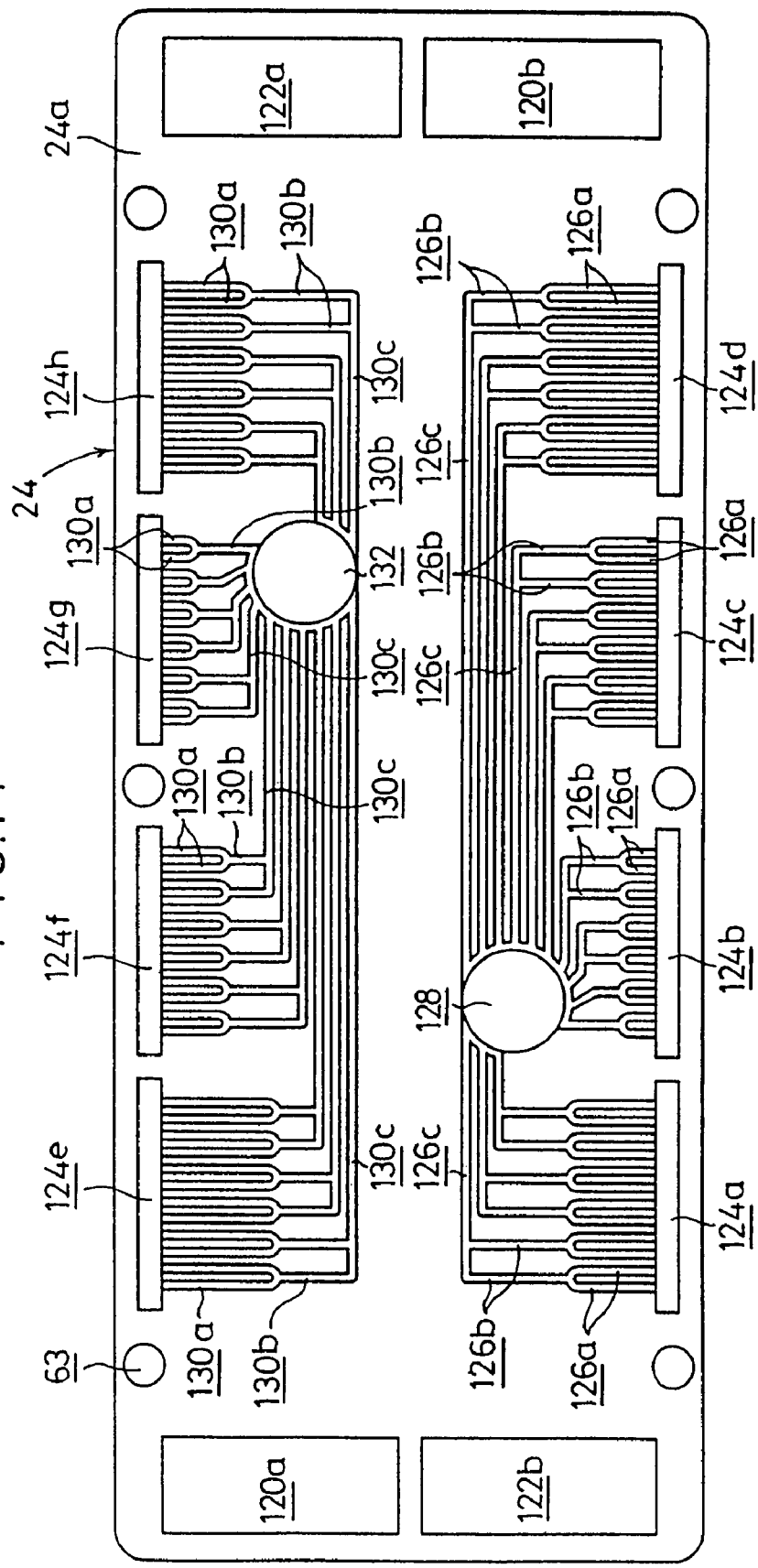
FIG. 11 shows a front view illustrating an inner surface of a second end plate for constructing the fuel cell stack.

As shown in FIGS. 10 and 11, the second end plate 24 is constructed to have a rectangular configuration. An oxygen-containing gas inlet 120a and a fuel gas inlet 122a are formed to penetrate through upper portions of the both end edges on the short side. An oxygen-containing gas outlet 120b and a fuel gas outlet 122b are provided at lower portions of the both end edges on the short side so that they are disposed at diagonal positions with respect to the oxygen-containing gas inlet 120a and the fuel gas inlet 122a respectively.

First cooling medium flow passage grooves 124a to 124d which communicate with the cooling medium inlets 70a to 70d of the second separator 36, and second cooling medium flow passage grooves 124e to 124h which communicate with the cooling medium outlets 70e to 70h of the second separator 36 are provided on the inner surface 24a of the first end plate 24 so that they are lengthy in the horizontal direction and each of them has a predetermined depth. Each of the first cooling medium flow passage grooves 124a to 124d communicates with ends of twelve first grooves 126a. The first grooves 126a extend upwardly in parallel to one another. After that, two of the first grooves 126a are merged into each of second grooves 126b. Two of the second grooves 126b are merged into each of third grooves 126c which communicate with a cooling medium-introducing port 128.

Similarly, each of the second cooling medium flow passage grooves 124e to 124h communicates with twelve first grooves 130a. The first grooves 130a extend vertically downwardly, and two of them are merged into each of second grooves 130b. Two of the second grooves 130b are merged into each of third grooves 130c which communicate with a single cooling medium discharge port 132. As shown in FIG. 10, a supply tube passage 134 and a discharged tube passage 136 are connected to the cooling medium-introducing port 128 and the cooling medium discharge port 132 respectively. Each of the supply tube passage 134 and the discharge tube passage 136 protrudes by a predetermined length outwardly from the first fuel cell stack 12. Holes 63 for inserting tie rods therethrough are formed at six positions of the second end plate 24 (see FIG. 11).

Those provided in the first fuel cell stack 12 are an oxygen-containing gas supply/discharge passage 138a which makes communication for the oxygen-containing gas inlet 120a of the second end plate 24, the oxygen-containing gas inlet 56a and the oxygen-containing gas outlet 56b of the first separator 34, and the oxygen-containing gas outlet 120b of the second end plate 24 and which is constructed to have a U-shaped configuration, a fuel gas supply/discharge passage 138b which makes communication for the fuel gas inlet 122a of the second end plate 24, the fuel gas inlet 68a and the fuel gas outlet 68b of the second separator 36, and the fuel gas outlet 122b of the second end plate 24 and which is constructed to have a U-shaped configuration, and a cooling medium supply/discharge passage 138c which makes communication for the supply tube passage 134 of the second end plate 24, the cooling medium inlets 70a to 70d and the cooling medium outlets 70e to 70h of the second separator 36, and the discharge tube passage 136 of the second end plate 24 and which is constructed to have a U-shaped configuration. The oxygen-containing gas supply/discharge passage 138a and the fuel gas supply/discharge passage 138b are provided and disposed at upper and lower portions at both ends in the lateral direction (long side direction) in the first fuel cell stack 12.

Figure 13:
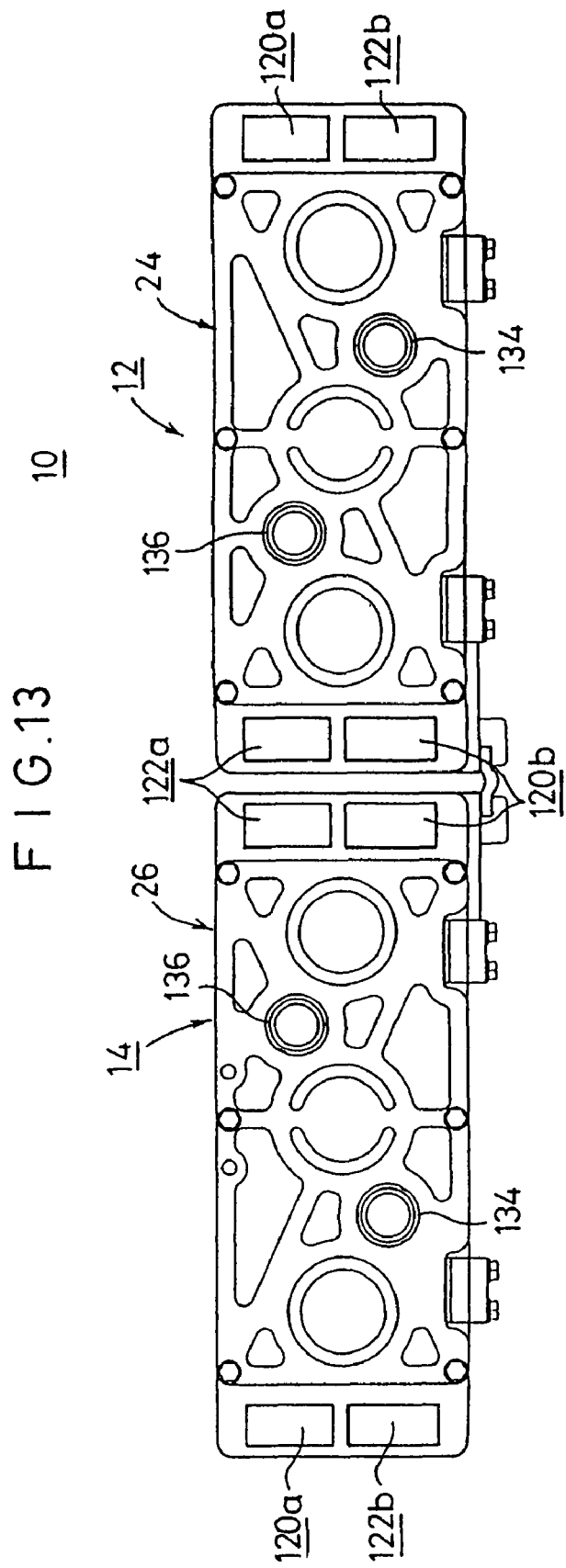
FIG. 13 shows a front view illustrating the fuel cell system in a state in which a piping mechanism is omitted from the illustration.

As shown in FIGS. 10 and 13, the cooling medium-introducing port 128 and the cooling medium discharge port 132 are provided and disposed at substantially central portions in the surface of the second end plate 24, i.e., at inner positions in the upper and lower directions and in the right and left directions with respect to the oxygen-containing gas inlet 120a, the fuel gas inlet 122a, the oxygen-containing gas outlet 120b, and the fuel gas outlet 122b.

As shown in FIG. 7, the first fuel cell stack 12 is integrally tightened and fixed in the stacking direction (direction of the arrow A) by the aid of a tightening mechanism 140. The tightening mechanism 140 comprises a liquid chamber 142 which is provided on the outer surface side of the first end plate 16, a non-compressive liquid for applying the surface pressure, for example, silicone oil 144 which is enclosed in the liquid chamber 142, and three belleville springs 146a to 146c which are provided on the outer surface side of the second end plate 24 and which are arranged by being separated from each other by predetermined spacing distances in the horizontal direction in order to press the second end plate 24 toward the first end plate 16.

A backup plate 148 is arranged opposingly to the first end plate 16 with the liquid chamber 142 intervening therebetween. The liquid chamber 142 is constructed between the backup plate 148 and a thin plate 150 made of aluminum or stainless steel. The belleville springs 146a to 146c are arranged while being separated from each other by substantially equal spacing distances on the surface of the second end plate 24, and they are supported by an attachment plate 152. Six tie rods 154 are inserted from the attachment plate 152 to the backup plate 148 to penetrate through the first fuel cell stack 12. Nuts 156 are screwed into ends of the tie rods 154. Accordingly, the first fuel cell stack 12 is held in an integrated manner.

Figure 12:
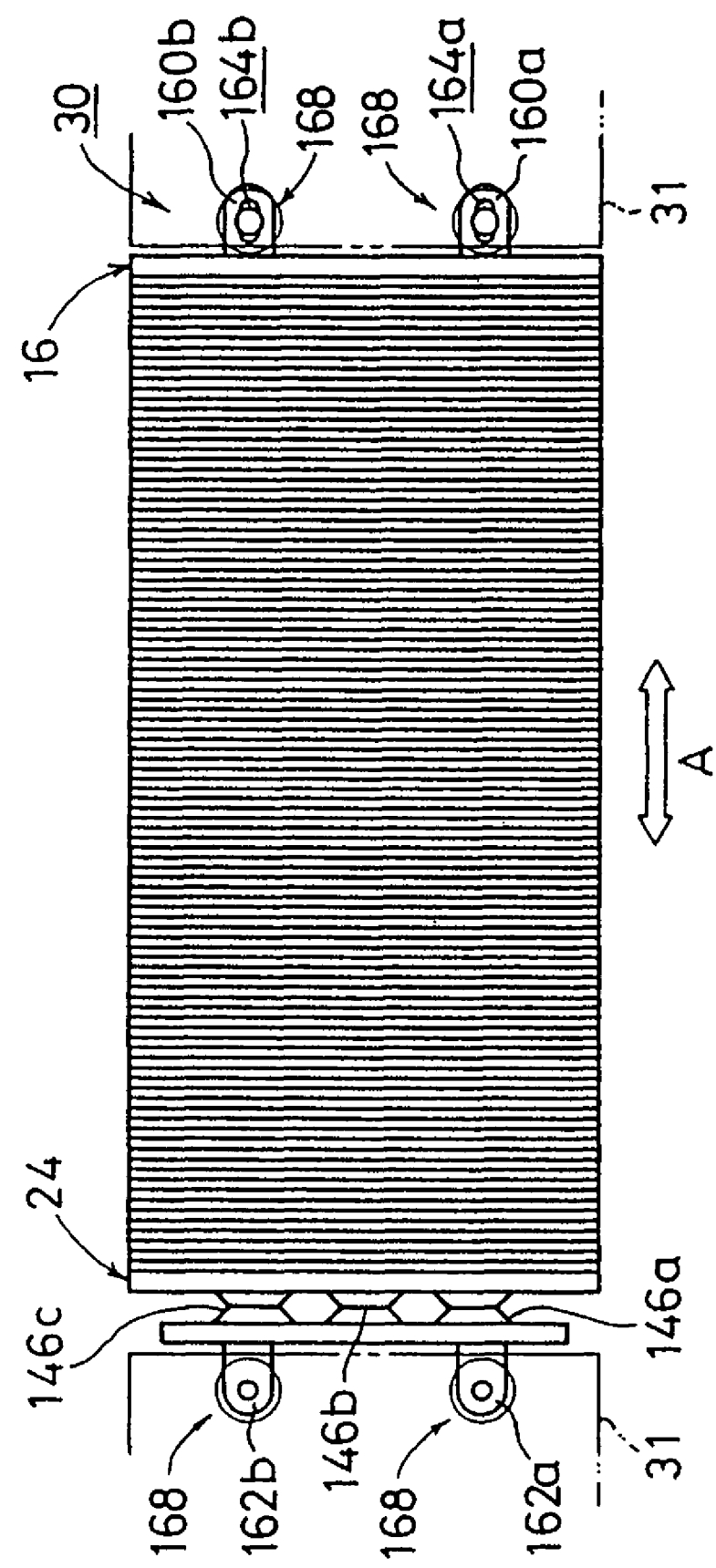
FIG. 12 shows a plan view illustrating the fuel cell stack.

As shown in FIGS. 2 and 12, the attachment mechanism 30 comprises bracket sections 160a, 160b which are provided integrally on the lower side of the first end plate 16, and mount brackets 162a, 162b which are fastened by screws on the lower side of the second end plate 24. Long holes 164a, 164b, which are lengthy in the stacking direction (direction of the arrow A) of the first fuel cell stack 12, are formed in the bracket sections 160a, 160b respectively. On the other hand, holes 166a, 166b are formed in the mount brackets 162a, 162b respectively.

Rubber mounts 168 are arranged for the long holes 164a, 164b and the holes 166a, 166b respectively. The rubber mount 168 is provided with upper and lower screw sections 170a, 170b. A collar 172 is arranged for the screw section 170a which protrudes at the upper portion. The collar 172 is inserted into the long hole 164a, 164b therefrom, and a nut 174 is screwed to the screw section 170a. On the side of the mount bracket 162a, 162b, the screw section 170a of the rubber mount 168 is inserted into the hole 166a, 166b, and a nut 174 is screwed to the forward end thereof. The screw sections 170b, which protrude on the lower side of the rubber mounts 168, are inserted into the attachment plate 31, and nuts 176 are screwed thereto. Accordingly, the first fuel cell stack 12 is fixed to the vehicle or the like.

Figure 14:
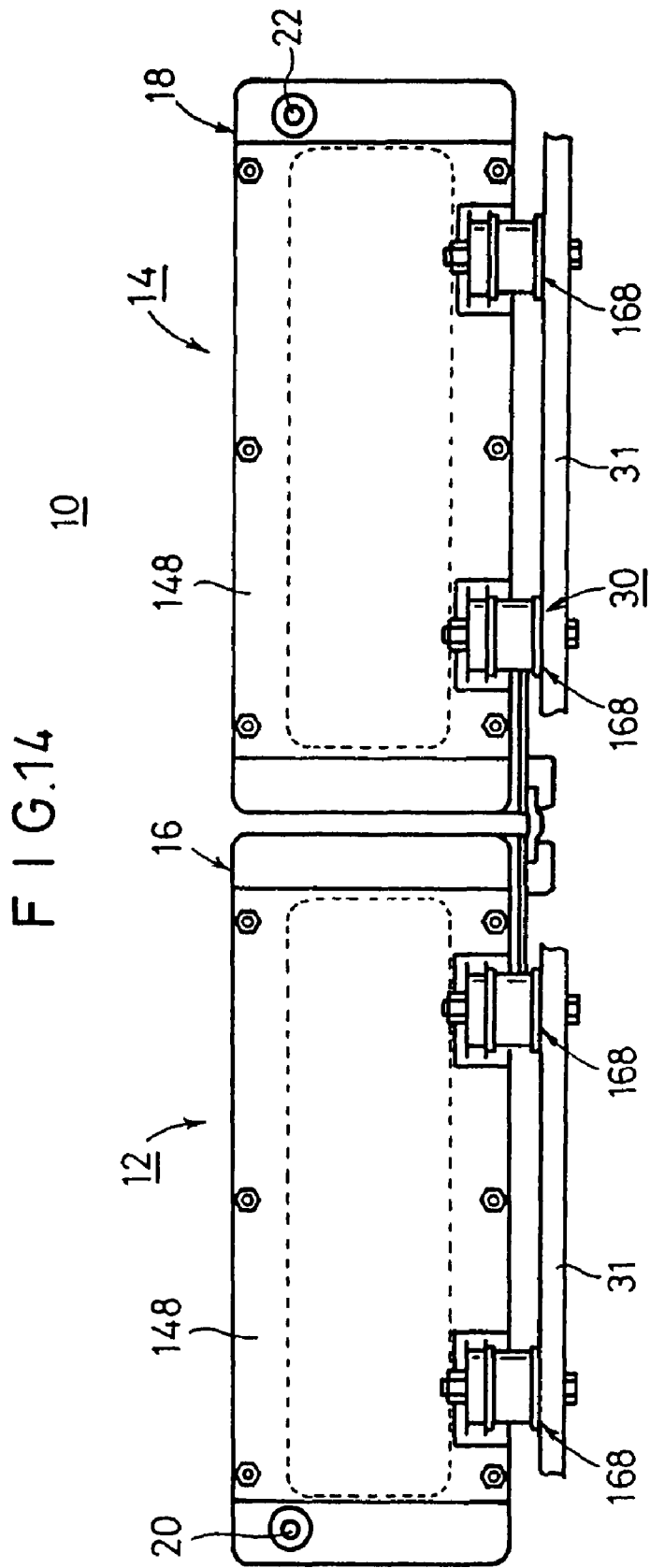
FIG. 14 shows a back view illustrating the fuel cell system.

As shown in FIG. 13, the second fuel cell stack 14 is constructed symmetrically with respect to the first fuel cell stack 12 described above. The cathode electrode 40 and the anode electrode 42 are arranged on opposite sides with respect to the ion exchange membrane 38. The second electric power-deriving terminal 22, which serves as a negative electrode, is provided on the side of the first end plate 18 (see FIG. 14). The second fuel cell stack 14 is basically constructed in the same manner as the first fuel cell stack 12. The same constitutive components are designated by the same reference numerals, detailed explanation of which will be omitted.

Figure 15:
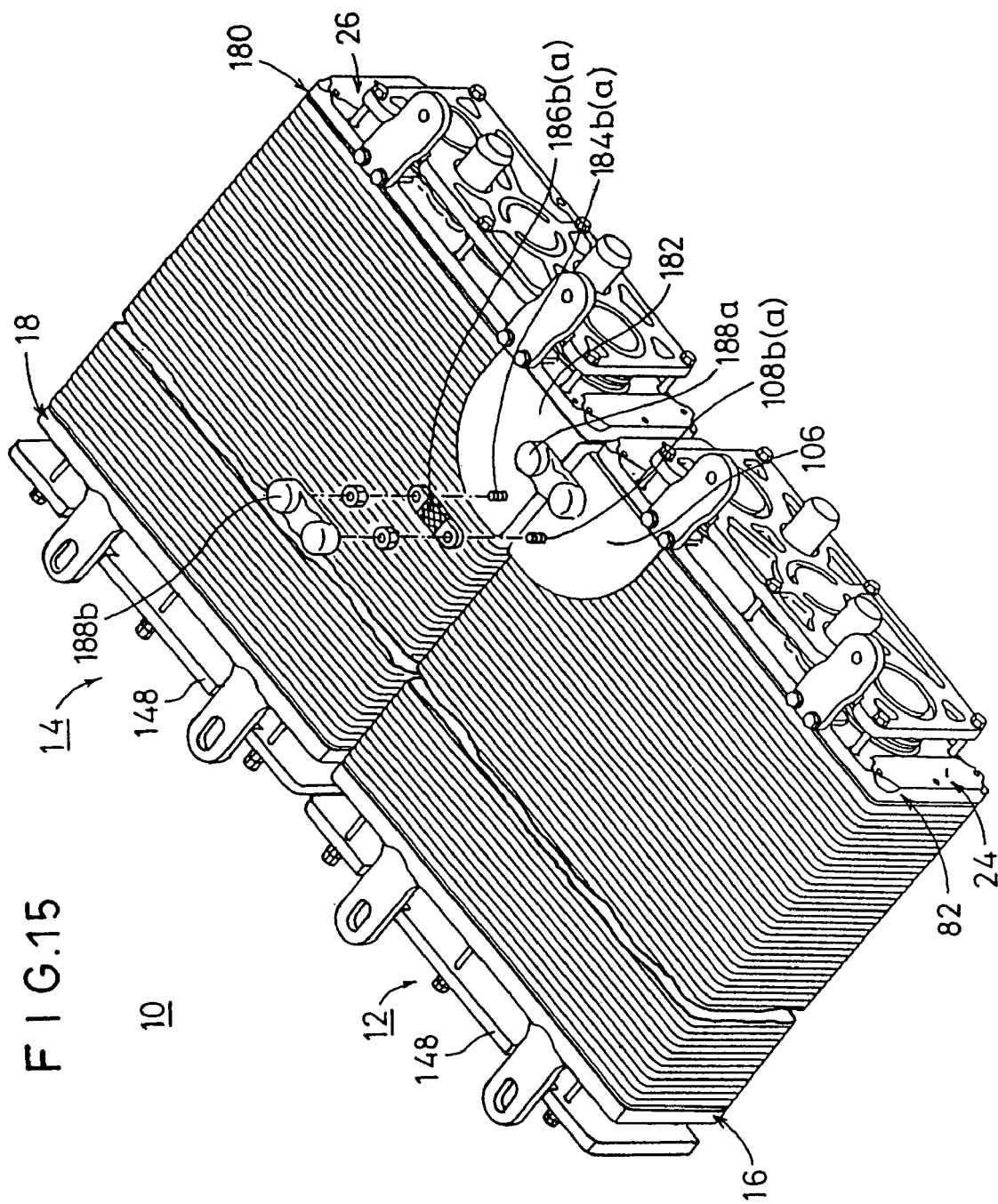
FIG. 15 shows a perspective view illustrating the lower side of the fuel cell system.

As shown in FIG. 15, the second fuel cell stack 14 is provided with a second conductive plate 180. The second conductive plate 180 is provided with a second connecting plate section 182 which extends under the second fuel cell stack 14 and which is disposed closely to the first connecting plate section 106 of the first conductive plate 82 provided for the first fuel cell stack 12. A pair of bolt sections 108a, 108b, 184a, 184b are provided for each of the first and second connecting plate sections 106, 182.

Flexible connectors, for example, strand wires 186a, 186b are connected to the bolt sections 108a, 184a and the bolt sections 108b, 184b respectively. The strand wire 186a, 186b is constructed by twisting a large number of thin conductive wires into a net-shaped configuration. The strand wires 186a, 186b are covered with rubber covers 188a, 188b respectively.

As shown in FIG. 13, the fuel gas inlet 122a and the oxygen-containing gas outlet 120b are arranged at the mutually close positions on the second end plates 24, 26 for constructing the first and second fuel cell stacks 12, 14 respectively. The piping mechanism 28 is incorporated into the second end plates 24, 26.

Figure 16:
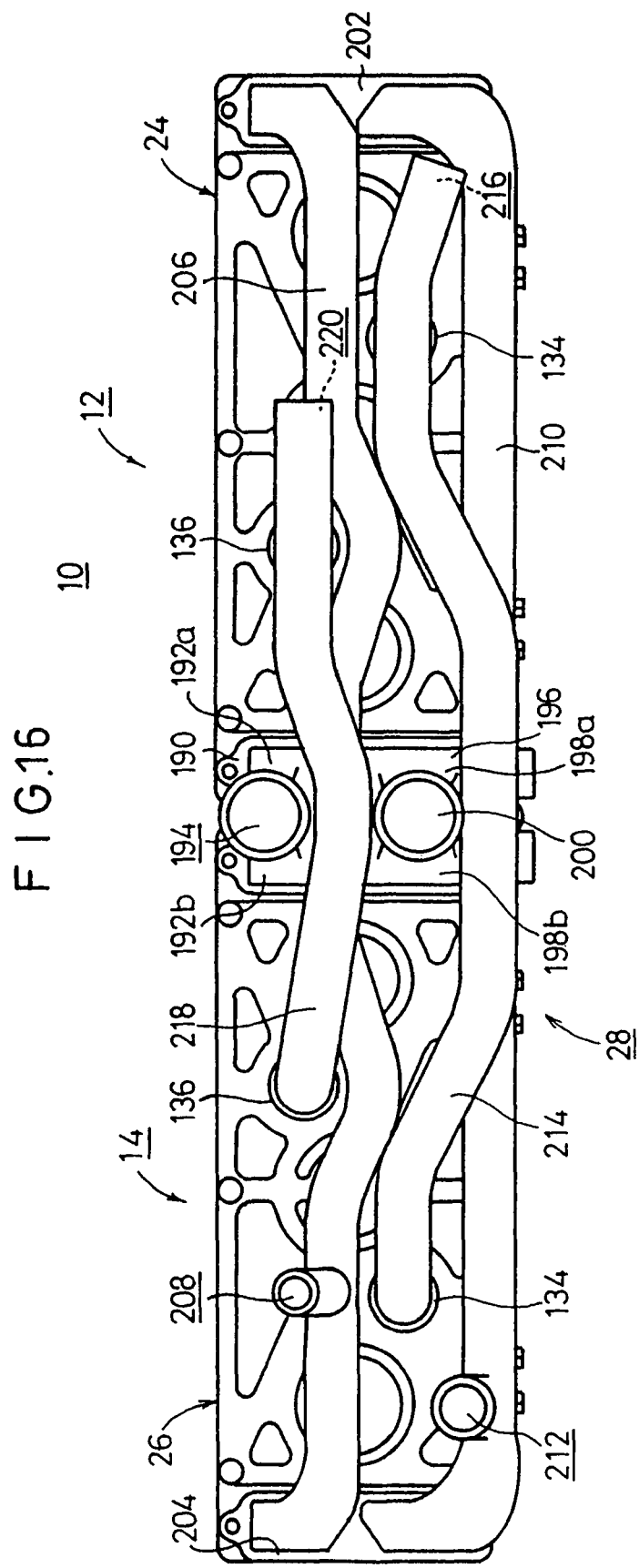
FIG. 16 shows a front view illustrating the fuel cell system.

As shown in FIGS. 1 and 16, the piping mechanism 28 is provided with a first bracket 190 which covers the respective fuel gas inlets 122a of the second end plates 24, 26 for constructing the first and second fuel cell stacks 12, 14 arranged in parallel to one another and which is integrally fixed to the second end plates 24, 26. The first bracket 190 is provided with fuel gas supply tubes 192a, 192b which communicate with the respective fuel gas inlets 122a respectively. The fuel gas supply tubes 192a, 192b are merged to make communication with a fuel gas supply port 194.

A second bracket 196 is fixed to the second end plates 24, 26, while covering the respective oxygen-containing gas outlets 120b. Forward ends of oxygen-containing gas discharge tubes 198a, 198b communicating with the oxygen-containing gas outlets 120b provided in the second bracket 196 respectively communicate with an oxygen-containing gas discharge port 200 in an integrated manner.

Third and fourth brackets 202, 204 are fixed to the second end plates 24, 26, while covering the respective oxygen-containing gas inlets 120a and the fuel gas outlets 122b. Both ends of an oxygen-containing gas supply tube 206, which communicate with the oxygen-containing gas inlets 120*a*, communicate with the third and fourth brackets 202, 204. An oxygen-containing gas supply port 208 is provided at an intermediate portion of the oxygen-containing gas supply tube 206. Both ends of a fuel gas discharge tube 210, which communicate with the fuel gas outlets 122*b*, communicate with the third and fourth brackets 202, 204. A fuel gas discharge port 212 is provided at an intermediate portion of the fuel gas discharge tube 210.

Both ends of a cooling medium supply tube 214 are connected to the respective supply tube passages 134 provided on the second end plates 24, 26. The cooling medium supply tube 214 is provided with a cooling medium supply port 216. A cooling medium discharge tube 218 is connected to the respective discharge tube passages 136 provided on the second end plates 24, 26. The cooling medium discharge tube 218 is provided with a cooling medium discharge port 220.

The operation of the fuel cell system 10 constructed as described above will be explained below.

As shown in FIG. 1, the fuel gas (for example, a hydrogen-containing gas obtained by reforming hydrocarbon) is supplied from the fuel gas supply port 194 for constructing the fuel gas supply/discharge passage 138*b*, to the fuel cell system 10. The air or the gas containing oxygen (hereinafter simply referred to as "air") as the oxygen-containing gas is supplied to the oxygen-containing gas supply port 208 for constructing the oxygen-containing gas supply/discharge passage 138*a*. The cooling medium is supplied to the cooling medium supply port 216 for constructing the cooling medium supply/discharge passage 138*c*.

The fuel gas, which is supplied to the fuel gas supply port 194, passes through the fuel gas supply tubes 192*a*, 192*b*, and it is fed to the respective fuel gas inlets 122*a* of the second end plates 24, 26 for constructing the first and second fuel cell stacks 12, 14. The fuel gas is introduced into the first fuel gas flow passage grooves 72 from the respective fuel gas inlets 68*a* of the second separators 36. As shown in FIG. 5, the fuel gas, which is supplied to the first fuel gas flow passage grooves 72, is moved in the direction of the gravity while meandering in the horizontal direction along the surface 36*a* of the second separator 36.

During this process, the hydrogen gas in the fuel gas passes through the second gas diffusion layer 46, and it is supplied to the anode electrode 42 of the fuel cell unit 32. The fuel gas, which is not used, is supplied to the anode electrode 42 while moving along the first gas flow passage grooves 72. The fuel gas, which is not used, is discharged from the fuel gas outlet 68*b* via the second fuel gas flow passage grooves 73. The fuel gas, which is not used, passes through the respective fuel gas outlets 122*b* of the second end plates 24, 26, and it is introduced into the fuel gas discharge tube 210. The fuel gas is discharged from the fuel cell system 10 via the fuel gas discharge port 212.

On the other hand, the air, which is supplied to the oxygen-containing gas supply port 208, is fed to the respective oxygen-containing gas inlets 120*a* provided for the second end plates 24, 26 via the oxygen-containing gas supply tube 206. The air is further supplied to the oxygen-containing gas inlets 56*a* of the first separators 34 incorporated into the first and second fuel cell stacks 12, 14 (see FIG. 3). In the first separator 34, the air, which is supplied to the oxygen-containing gas inlet 56*a*, is introduced into the first oxygen-containing gas flow passage grooves 62 in the surface 34*a*. The air is moved in the direction of the gravity while meandering in the horizontal direction along the first oxygen-containing gas flow passage grooves 62.

During this process, the oxygen gas in the air is supplied from the first gas diffusion layer 44 to the cathode electrode 40. On the other hand, the air, which is not used, is discharged from the oxygen-containing gas outlet 56*b* via the second oxygen-containing gas flow passage grooves 65. The air, which is discharged to the oxygen-containing gas outlets 56*b*, passes through the oxygen-containing gas outlets 120*b* provided for the second end plates 24, 26, and it is discharged from the oxygen-containing gas discharge port 200 via the oxygen-containing gas discharge tubes 198*a*, 198*b* (see FIG. 1).

Accordingly, the electric power is generated in the first and second fuel cell stacks 12, 14. The electric power is supplied to a load, for example, an unillustrated motor to be connected between the first and second electric power-deriving terminals 20, 22 which have the mutually different characteristics.

The interior of the first and second fuel cell stacks 12, 14 is effectively cooled by the cooling medium. That is, the cooling medium, which is supplied to the cooling medium supply port 216, is introduced into the supply tube passages 134 provided for the second end plates 24, 26 from the cooling medium supply tube 214. As shown in FIG. 11, the cooling medium is introduced into the cooling medium-introducing port 128 of the second end plates 24, 26. The cooling medium is fed from the plurality of second grooves 126*b* via the first grooves 126*a* to the first cooling medium flow passage grooves 124*a* to 124*d*.

The cooling medium, which is introduced into the first cooling medium flow passage grooves 124*a* to 124*d*, is introduced into the cooling medium inlets 70*a* to 70*d* formed on the lower side of the second separator 36. As shown in FIG. 6, the cooling medium is moved from the lower side to the upper side through the cooling medium flow passages 74*a* to 74*d* which communicate with the cooling medium inlets 70*a* to 70*d*. The cooling medium, which has passed through the cooling medium flow passages 74*a* to 74*d* to cool the respective fuel cell units 32, passes through the cooling medium outlets 70*e* to 70*h*, and it is introduced into the second cooling medium flow passage grooves 124*e* to 124*h* of the second end plates 24, 26 (see FIG. 11).

The cooling medium, which is introduced into the second cooling medium flow passage grooves 124*e* to 124*h*, is fed from the first grooves 130*a* via the second grooves 130*b* to the cooling medium outlet 132. The cooling medium passes through the discharge tube passage 136, and it is discharged from the cooling medium discharge port 220 via the cooling medium discharge tube 218.

In the first embodiment of the present invention, as shown in FIG. 10, for example, the oxygen-containing gas inlet 56*a*, the fuel gas inlet 68*a*, the oxygen-containing gas outlet 56*b*, and the fuel gas outlet 68*b* are provided at the upper and lower portions at the both ends in the lateral direction (direction of the arrow C) in the first fuel cell stack 12. Further, for example, the cooling medium inlets 70*a* to 70*d* and the cooling medium outlets 70*e* to 70*h* are provided at the lower portions and the upper portions on the long side. Accordingly, the first fuel cell stack 12 can be set to have a horizontal length longer than a vertical length. It is possible to construct the first fuel cell stack 12 to have a low dimension in the height direction.

Especially, in the first embodiment, the oxygen-containing gas supply/discharge passage 138*a* and the fuel gas supply/discharge passage 138*b* are provided and disposed at the upper and lower portions at the both ends in the lateral direction (long side direction) in the first fuel cell stack 12. The cooling medium supply/discharge passage 138*c* is not provided at the both ends in the lateral direction in the first fuel cell stack 12. Accordingly, the following effect is obtained. That is, it is possible to design the first fuel cell stack 12 to have the lower dimension in the height direction. The fuel cell system 10 can be easily carried in the low space, for example, under the floor of the automobile body.

Further, each of the oxygen-containing gas inlet 56a, the fuel gas inlet 68a, the oxygen-containing gas outlet 56b, and the fuel gas outlet 68b is designed to have the rectangular configuration which is lengthy in the vertical direction. Accordingly, for example, the flow rates of the oxygen-containing gas and the fuel gas are effectively increased as compared with a circular configuration. It is possible to reliably supply, in a dispersed manner, the oxygen-containing gas and the fuel gas to the cathode electrode 40 and the anode electrode 42 for constructing each of the fuel cell units 32.

In the first embodiment, as shown in FIG. 6, the cooling medium is moved from the lower side to the upper side along the cooling medium flow passages 74a to 74d which communicate with the cooling medium inlets 70a to 70d provided on the lower side of the second separator 36. After that, the cooling medium is discharged to the cooling medium outlets 70e to 70h. Therefore, the following advantage is obtained. That is, the air, which co-exists in the cooling medium in a mixed manner, is moved smoothly and reliably from the lower side to the upper side along the cooling medium flow passages 74a to 74d. Thus, the air vent process is effectively performed.

The cooling medium flow passages 74a to 74d are provided in the short side direction (direction of the gravity) of the second separator 36. Accordingly, the following effect is obtained. That is, the distance of the flow of the cooling medium in the surface 36a of the second separator 36 is shortened, and the pressure loss is decreased. It is possible to suppress the occurrence of the temperature distribution in the power generation surface. The cooling efficiency effected by the cooling medium is effectively improved.

In the first embodiment, as shown in FIGS. 11 and 13, the cooling medium-introducing port 128 and the cooling medium discharge port 132 are provided and disposed at the approximately central portions of the surface 24a of the second end plate 24. The cooling medium, which is introduced into the cooling medium-introducing port 128, is supplied to the cooling medium inlets 70a to 70d in a divided manner. On the other hand, the cooling medium, which is discharged via the cooling medium outlets 70e to 70h, is integrally derived to the cooling medium discharge port 132. Accordingly, the piping structure for the cooling medium is effectively simplified. The dimension in the height direction of the first fuel cell stack 12 can be shortened easier. Therefore, the fuel cell system 10 is allowed to be thin-walled in an effective manner. For example, it is possible to allow the fuel cell system 10 to be carried under the floor of the automobile body with ease.

In the first embodiment, the holes 63 are formed and located between the cooling medium supply/discharge passages 138c in the first fuel cell stack 12. The tie rods 154 are inserted into the holes 63 to integrally hold the first fuel cell stack 12. Accordingly, it is possible to effectively utilize remaining portions of the first and second separators 34, 36. Further, the entire first fuel cell stack 12 can be designed to have the small dimension in the height direction.

In the first embodiment, as shown in FIG. 13, the oxygen-containing gas supply/discharge passage 138a, the fuel gas supply/discharge passage 138b, and the cooling medium supply/discharge passage 138c are provided in the first fuel cell stack 12. The oxygen-containing gas supply/discharge passage 138a, the fuel gas supply/discharge passage 138b, and the cooling medium supply/discharge passage 138c are provided in the second fuel cell stack 14 symmetrically to the first fuel cell stack 12 described above. Further, the oxygen-containing gas inlet 120a, the fuel gas inlet 122a, the oxygen-containing gas outlet 120b, and the fuel gas outlet 122b are provided symmetrically to one another while being disposed at the upper and lower portions at the both ends in the lateral direction (direction of the arrow C), for the second end plates 24, 26 which serve as the identical vertical surface of the first and second fuel cell stacks 12, 14.

Accordingly, as shown in FIGS. 1 and 16, the following effect is obtained. That is, the fuel gas supply tubes 192a, 192b for making communication between the respective fuel gas inlets 122a of the second end plates 24, 26, and the oxygen-containing gas discharge tubes 198a, 198b for making communication between the respective oxygen-containing gas outlets 120b can be constructed to be short as much as possible. It is possible to effectively simplify the entire piping mechanism 28. Further, the supply tube passages 134 and the discharge tube passages 136 are provided for the second end plates 24, 26. The following advantage is obtained. That is, the piping operation for the oxygen-containing gas, the fuel gas, and the cooling medium is effected in a concentrated manner on one surface. The operability for the piping is effectively improved.

In the first embodiment, the oxygen-containing gas inlet 120a, the fuel gas inlet 122a, the oxygen-containing gas outlet 120b, and the fuel gas outlet 122b are provided at the upper and lower portions at the both ends in the lateral direction in the surface of each of the second end plates 24, 26. The cooling medium supply port 128 and the cooling medium discharge port 132 are provided at the positions disposed inwardly in the upper and lower directions and in the right and left directions (see FIG. 13). Accordingly, it is possible to shorten the dimension in the height direction (direction of the arrow B) of the second end plate 24, 26 as much as possible. The fuel cell system 10 can be designed to have the low height.

In this arrangement, the first and second electric power-deriving terminals 20, 22 are provided on the vertical surface on the side of the first end plates 16, 18 of the first and second fuel cell stacks 12, 14. No projection such as a connecting terminal exists on the upper side of the fuel cell system 10. Therefore, the fuel cell system 10 is thin-walled as much as possible. The upper portion of the fuel cell system 10 is constructed to be flat, and it is possible to effectively utilize the space on the upper side. It is possible to effectively use the fuel cell system 10 especially for being carried on the vehicle.

In the first embodiment, the piping operation is performed for the piping mechanism 28 on the side of the second end plates 24, 26 after assembling the first and second fuel cell stacks 12, 14. Accordingly, the following effect is obtained. That is, the assembling operability is improved all at once for the entire fuel cell system 10. It is possible to assemble the fuel cell system 10 efficiently in a short period of time.

In the first embodiment, the first and second fuel cell stacks 12, 14 are arranged in parallel in the stacking direction to construct the fuel cell system 10. However, an equivalent effect is obtained even when only the first fuel cell stack 12 is used.

Figure 17:
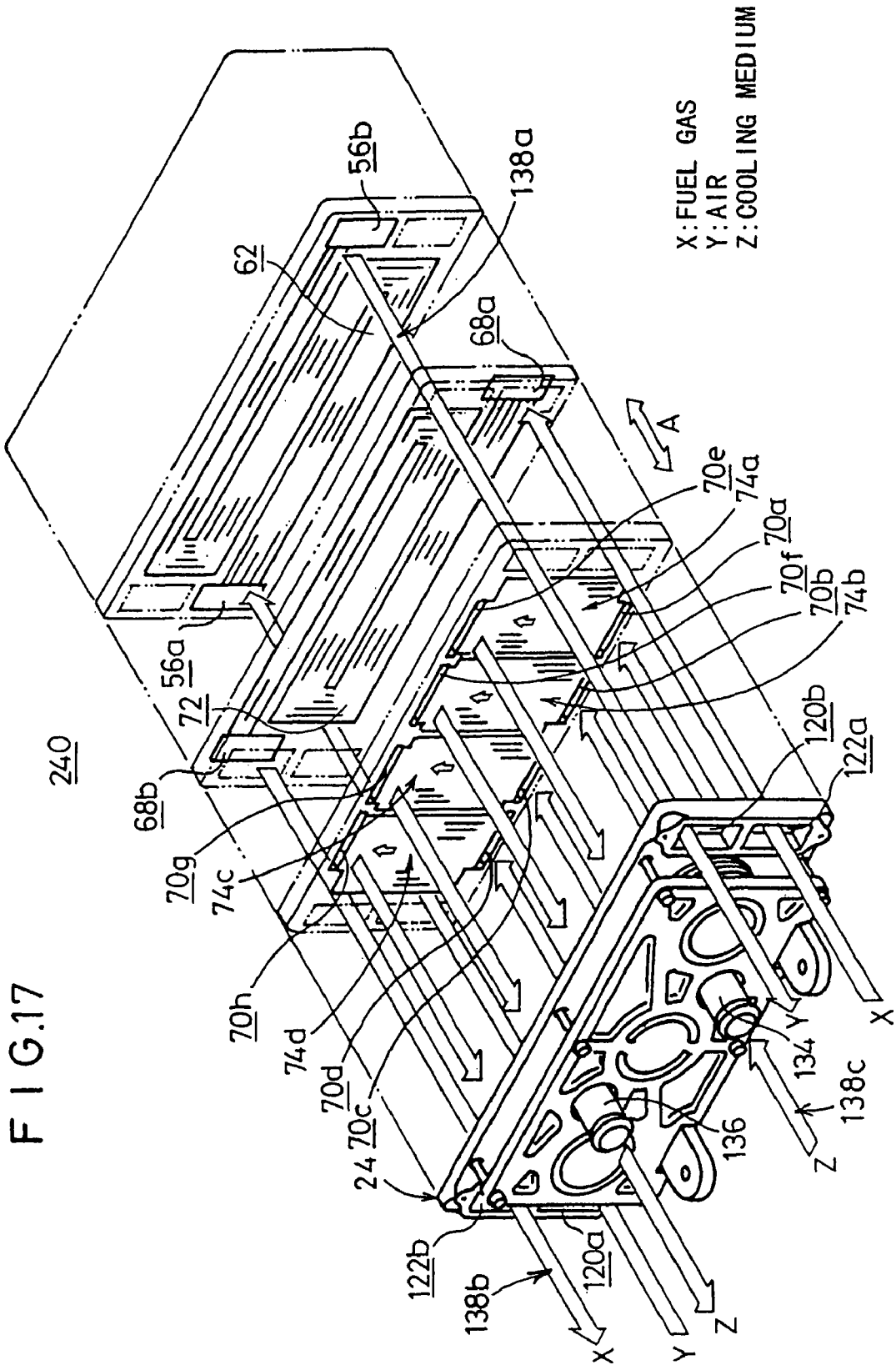
FIG. 17 illustrates flow passages depicting the flows of fluids in a fuel cell stack according to a second embodiment of the present invention.
Figure 18:
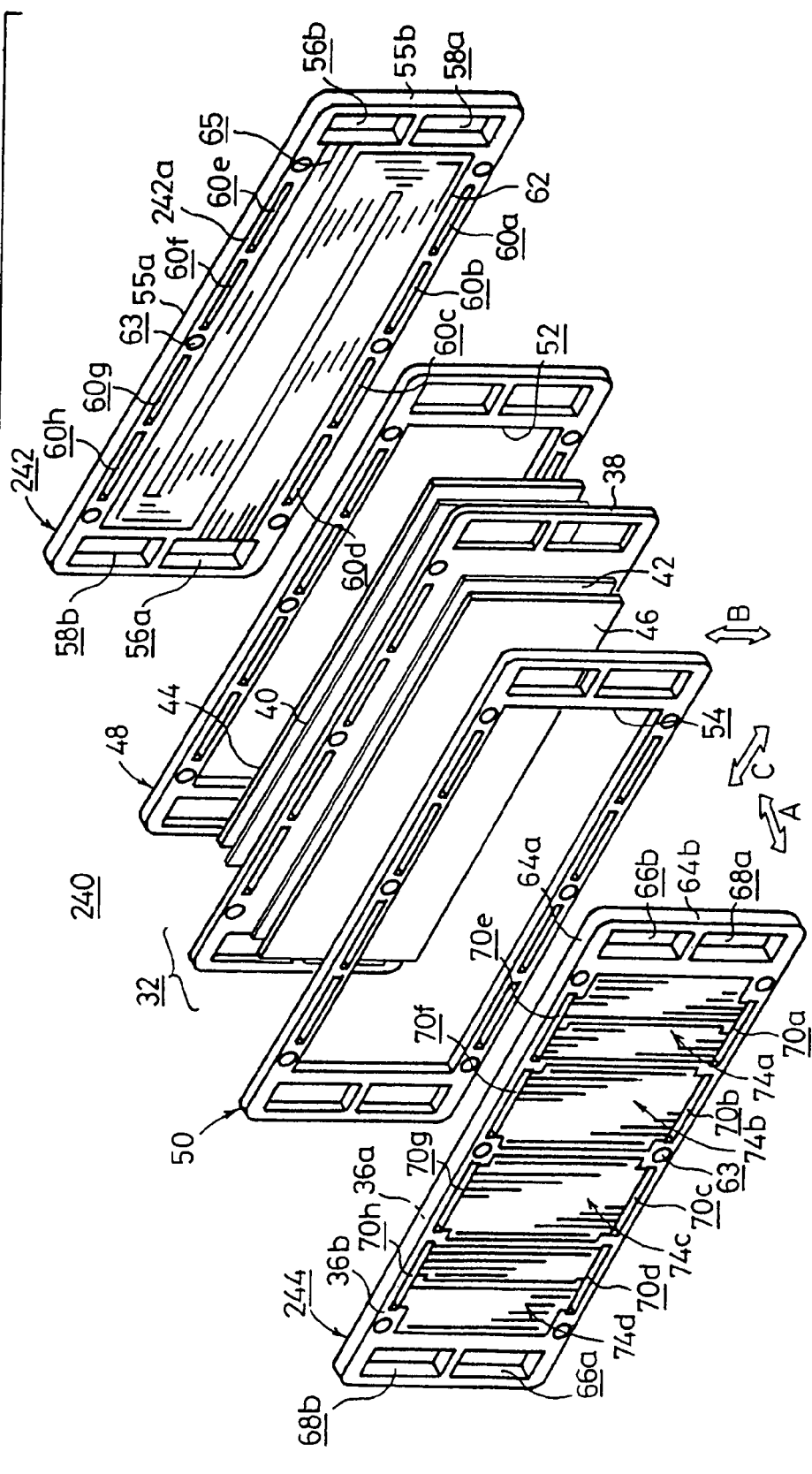
FIG. 18 shows an exploded perspective view illustrating major components of the fuel cell stack.

FIG. 17 illustrates flow passages depicting the flows of fluids in a fuel cell stack 240 according to a second embodiment of the present invention, and FIG. 18 shows an exploded perspective view illustrating major components of the fuel cell stack 240. The same constitutive components as those of the first fuel cell stack 12 according to the first embodiment are designated by the same reference numerals, detailed explanation of which will be omitted.

Each of first and second separators 242, 244 for constructing the fuel cell stack 240 is designed to have a rectangular configuration. Oxygen-containing gas inlets 56a, 66a and fuel gas inlets 58a, 68a are provided at lower portions at both end edges on short sides 55b, 64b of the first and second separators 242, 244. Oxygen-containing gas outlets 56b, 66b and fuel gas outlets 58b, 68b are provided at upper portions at both end edges on the short sides 55b, 64b of the first and second separators 242, 244.

Ten first oxygen-containing gas flow passage grooves 62, which are independent from each other and which communicate with the oxygen-containing gas inlet 56a, are provided in the direction of the antigravity on an inner surface 242a of the first separator 242 while making turns on the short side 55b and meandering in the horizontal direction. The first oxygen-containing gas flow passage grooves 62 are merged into five second oxygen-containing gas flow passage grooves 65. The second oxygen-containing gas flow passage grooves 65 communicate with the oxygen-containing gas outlet 56b.

As shown in FIG. 19, ten first fuel gas flow passage grooves 72, which communicate with the fuel gas inlet 68a, are formed on a surface 244a of the second separator 244. The first fuel gas flow passage grooves 72 are provided in the direction of the antigravity while making turns on the short side 64b and meandering in the horizontal direction. The first fuel gas flow passage grooves 72 are merged into five second fuel gas flow passage grooves 73, and then the second fuel gas flow passage grooves 73 communicate with the fuel gas outlet 68b.

As shown in FIG. 17, an oxygen-containing gas supply/discharge passage 138a, a fuel gas supply/discharge passage 138b, and a cooling medium supply/discharge passage 138c are provided in the fuel cell stack 240. The supply side portions are provided at the lower portions at the both ends in the lateral direction, while the discharge side portions are provided at the upper portions at the both ends in the lateral direction in the fuel cell stack 240 for the oxygen-containing gas supply/discharge passage 138a and the fuel gas supply/discharge passage 138b, in the same manner as the cooling medium supply/discharge passage 138c.

In the second embodiment constructed as described above, the air and the fuel gas are supplied to the oxygen-containing gas supply/discharge passage 138a and the fuel gas supply/discharge passage 138b from the lower portions at the both ends in the lateral direction in the fuel cell stack 240. The air is introduced into the first oxygen-containing gas flow passage grooves 62 in the surface 242a of the first separator 242, and it is moved in the direction of the antigravity while meandering in the horizontal direction. The air, which is not used, is discharged to the oxygen-containing gas outlet 56b via the second oxygen-containing gas flow passage grooves 65. The air is discharged from the upper portion at the both end in the lateral direction of the fuel cell stack 240.

On the other hand, the fuel gas is introduced into the first fuel gas flow passage grooves 72 in the surface 244a of the second separator 244, and it is moved in the direction of the antigravity while meandering in the horizontal direction. The fuel gas, which is not used, is discharged from the upper portion at the both end in the lateral direction of the fuel cell stack 240.

As described above, in the second embodiment, the supply side portions are provided at the lower portions of the fuel cell stack 240 for the oxygen-containing gas supply/discharge passage 138a and the fuel gas supply/discharge passage 138b, in the same manner as the supply side portions of the cooling medium supply/discharge passage 138c. Accordingly, the temperatures of the fuel gas and the air to be supplied can be set to be low corresponding to the temperature of the cooling medium on the inlet side. As a result, it is possible to decrease the humidifying amount for the fuel gas and the air. Therefore, it is easy to miniaturize a humidifying apparatus (not shown) for humidifying the fuel gas and the air. An effect is obtained such that it is possible to simplify the entire equipment and reduce the cost.

The discharge side portions of the oxygen-containing gas supply/discharge passage 138a and the fuel gas supply/discharge passage 138b are provided at the upper portions at the both ends in the lateral direction of the fuel cell stack 240. Therefore, when the piping (not shown), which is connected to the outlet of each of the oxygen-containing gas supply/discharge passage 138a and the fuel gas supply/discharge passage 138b, is arranged at a position lower than the outlet in order to avoid any counter flow of produced water, it is possible to effectively ensure the space in the height direction. Accordingly, the following advantage is obtained. That is, even when the placing surface for the fuel cell stack 240 is the floor surface, especially as in a case of the use for being carried on the vehicle, the piping on the outlet side can be arranged in an effectively lowered state for the oxygen-containing gas supply/discharge passage 138a and the fuel gas supply/discharge passage 138b.

In the fuel cell stack according to the present invention, the fuel cell unit is constructed to have the rectangular configuration having the horizontal length longer than the vertical length. The fuel gas supply/discharge passage and the oxygen-containing gas supply/discharge passage, which are disposed at the upper and lower portions at the both ends in the lateral direction, are provided in the fuel cell stack. Accordingly, the entire fuel cell stack can be effectively designed to have the low dimension in the height direction. Therefore, for example, the fuel cell stack can be easily carried in the low space such as those under the floor of the automobile body.

In the fuel cell stack according to the present invention, the fuel gas supply/discharge port and the oxygen-containing gas supply/discharge port are provided at the upper and lower portions at the both ends in the lateral direction. The plurality of cooling medium supply ports and the plurality of cooling medium discharge ports are provided at the upper and lower portions. Accordingly, the entire fuel cell stack can be designed to have the structure having the horizontal length longer than the vertical length. Further, the cooling medium flows from the lower portion to the upper portion. Accordingly, the air, which co-exists in the cooling medium in the mixed manner, can be smoothly discharged. The cooling medium flow passage is shortened. Thus, it is possible to reduce the pressure loss, and it is possible to avoid the occurrence of the temperature distribution.

Further, in the fuel cell system according to the present invention, the supply/discharge passages for the fuel gas and the like are provided symmetrically to one another in the first and second fuel cell stacks. The supply/discharge ports for the fuel gas and the oxygen-containing gas, which are disposed at the upper and lower portions at the both ends in the lateral direction, are provided symmetrically to one another on the mutually adjoining vertical surfaces. The supply/discharge ports for the cooling medium are provided and disposed at the inner positions in the upper and lower directions and in the right and left directions. Accordingly, the dimension in the height direction of the fuel cell stack can be effectively shortened. It is possible to effectively utilize the space on the upper side of the fuel cell system. Further, the supply/discharge ports for the fuel gas, the oxygen-containing gas, and the cooling medium are provided symmetrically on the identical vertical surfaces of the first and second fuel cell stacks. Therefore, the piping operation is simplified, and it is easy to simplify the manifold structure.

What is claimed is:

1. A fuel cell stack comprising:
a plurality of fuel cell units each including an anode electrode, and a cathode electrode, and a solid polymer ion exchange membrane interposed between said anode electrode and said cathode electrode, said plurality of fuel cell units being stacked with separators intervening therebetween, wherein
each of said fuel cell units has a rectangular shape having a first side, a second side, a third side and a fourth side, the first side and the second side being opposite to each other and having a first length, the third side and the fourth side being opposite to each other and having a second length longer than the first length; and
a fuel gas supply and discharge passage extends through said fuel stack for supplying a fuel gas to said plurality of fuel cell units and an oxygen-containing gas supply and discharge passage extends through said fuel cell stack for supplying an oxygen-containing gas to said plurality of fuel cell units,
said fuel gas supply and discharge passage including:
a fuel gas supply port at an upper portion of the first side; and
a fuel gas discharge port at a lower portion of the second side, the fuel gas supply port and the fuel gas discharge port being formed at diagonally opposite portions in each of said fuel cell units,
said oxygen-containing gas supply and discharge passage including:
an oxygen-containing gas supply port at an upper portion of the second side; and
an oxygen-containing gas discharge port at a lower portion of the first side, the oxygen-containing gas supply port and the oxygen-containing gas discharge port being formed at the other diagonally opposite portions in each of said fuel cell units;
a plurality of fuel gas flow passages connecting said fuel gas supply port and said fuel gas discharge port, said fuel gas flow passages being serpentine passages each having only four turns along an entire length of the passage, each turn changing a direction of the fuel gas flow; and
a plurality of oxygen-containing gas flow passages connecting said oxygen-containing gas supply port and said oxygen-containing gas discharge port, said oxygen-containing gas flow passages being serpentine passages each having only four turns along the entire length of the passage, each turn changing a direction of the oxygen-containing gas flow,
wherein each of the fuel gas supply port, the fuel gas discharge port, the oxygen-containing gas supply port and the oxygen-containing gas discharge port has a port shape elongated in a gravity direction extending parallel to the first and the second sides.

2. A fuel cell stack according to claim 1, wherein said turns of said serpentine passages are provided at opposite lateral ends of said plurality of fuel cell units.

3. A fuel cell stack according to claim 1, wherein said serpentine passages include a plurality of first grooves and a plurality of second grooves, wherein a selected number of said plurality of first grooves merge into a selected number of said plurality of second grooves.

4. A fuel cell stack according to claim 3, wherein a number of said plurality of second grooves is less than a number of said plurality of first grooves.

5. A fuel cell stack comprising:
a plurality of fuel cell units each including an anode electrode, a cathode electrode, and a solid polymer ion exchange membrane interposed between said anode electrode and said cathode electrode, said plurality of fuel cell units being stacked in a stacking direction with separators disposed therebetween,
wherein each of said fuel cell units has a rectangular shape with a first side, a second side, a third side and a fourth side, the first side and the second side being opposite to each other and having a first length, the third side and the fourth side being opposite to each other and having a second length greater than the first length;
a fuel gas supply and discharge passage and an oxygen-containing gas supply and discharge passage extending through said fuel cell stack for supplying a fuel gas to said plurality of fuel cell units through said fuel gas supply and discharge passage, and supplying an oxygen-containing gas to said plurality of fuel cell units through said oxygen-containing supply and discharge gas passage,
said fuel gas supply and discharge passage including
a fuel gas supply port formed at an upper portion of the first side in said plurality of fuel cell units and
a fuel gas discharge port formed at a lower portion of the second side in said plurality of fuel cell units,
said oxygen-containing gas supply and discharge passage including
an oxygen-containing gas supply port formed at an upper portion of the second
side in said plurality of fuel cell units and
an oxygen-containing gas discharge port formed at a lower portion of the first side in said fuel cell units; and
a plurality of fuel gas flow passages connecting said fuel gas supply port and said fuel gas discharge port, wherein said plurality of fuel gas flow passages are serpentine passages each having only four turns along an entire length of the passage, each turn changing a direction of the fuel gas flow,
wherein each of the fuel gas supply port, the fuel gas discharge port, the oxygen-containing gas supply port and the oxygen-containing gas discharge port has a port shape elongated in a gravity direction extending parallel to the first and the second sides.

6. The fuel cell stack of claim 5, further comprising a cooling medium supply and discharge passage for supplying a cooling medium provided at upper and lower portions in said fuel cell stack, said cooling medium supply and discharge passage including a supply port at a lower portion in said fuel cell stack and a discharge port at an upper portion in said fuel cell stack.

7. The fuel cell stack of claim 5, wherein said fuel gas supply port, said fuel gas discharge port, said oxygen-containing gas supply port and said oxygen-containing gas discharge port each have a rectangular shape having a first side and a second side, a length of the first side being longer than a length of the second side.

8. A fuel cell stack according to claim 5, wherein said serpentine passages include a plurality of first grooves and a plurality of second grooves, wherein a selected number of said plurality of first grooves merge into a selected number of said plurality of second grooves.

9. The fuel cell stack of claim 5, further comprising a plurality of oxygen-containing gas flow passages connecting said oxygen-containing gas supply port and said oxygen-containing gas discharge port.

10. The fuel cell stack of claim 9, wherein said plurality of oxygen-containing gas flow passages comprise serpentine passages each having four turns.

11. The fuel cell stack of claim 10, wherein said serpentine passages include a plurality of first grooves and a plurality of second grooves, wherein a selected number of said plurality of first grooves merge into a selected number of said plurality of second grooves.

12. The fuel cell stack of claim 5, wherein said fuel gas supply port and said fuel gas discharge port are formed at diagonally opposite portions in each of said fuel cell units.

13. The fuel cell stack of claim 5, wherein said oxygen-containing gas supply port and said oxygen-containing gas discharge port are formed at diagonally opposite portions in each of said fuel cell units.

14. A fuel cell stack, comprising:
a plurality of fuel cell units each including an anode electrode, a cathode electrode, and a solid polymer ion exchange membrane interposed between said anode electrode and said cathode electrode, said plurality of fuel cell units being stacked in a stacking direction with separators disposed therebetween, each of the fuel cell units having a rectangular shape having a first side, a second side, a third side and a fourth side, the first side and the second side being opposite to each other and having a first length, the third and fourth side being opposite to each other and having a second length longer than the first length;
a fuel gas supply and discharge passage extending through the plurality of fuel cell units for supplying a fuel gas to said plurality of fuel cell units through said fuel gas passage;
a supply port for the fuel gas supply and discharge passage formed at an upper portion of the first side of the plurality of fuel cell units;
a discharge port for the fuel gas supply and discharge passage formed at a lower portion of the second side of the plurality of fuel cell units; and
a plurality of fuel gas flow passages connecting said fuel gas supply port and said fuel gas discharge port, said fuel gas flow passages being serpentine passages having only four turns along an entire length of the passage, each turn changing a direction of the fuel gas flow,
wherein each of the fuel gas supply port and the fuel gas discharge port has a port shape elongated in a gravity direction extending parallel to the first and the second sides.

15. The fuel cell stack of claim 14, wherein the discharge port and the supply port are formed at diagonally opposite portions of said plurality of fuel cell units.

16. The fuel cell stack of claim 14, further comprising an oxygen-containing gas supply and discharge passage extending through said plurality of fuel cell units for supplying an oxygen-containing gas to said plurality of fuel cell units through said oxygen-containing gas passage.

17. The fuel cell stack of claim 16, further comprising a supply port for the oxygen-containing gas supply and discharge passage formed in an upper portion of the plurality of fuel cell units.

18. The fuel cell stack of claim 17, further comprising a discharge port for the oxygen-containing gas supply and discharge passage formed in a lower portion of the plurality of fuel cell units.

19. The fuel cell stack of claim 18, wherein the discharge port for the oxygen-containing gas supply and discharge passage and the supply port for the oxygen-containing gas passage are formed at diagonally opposite portions of said plurality of fuel cell units.

20. A fuel cell stack, comprising:
a plurality of fuel cell units each including an anode electrode, a cathode electrode, and a solid polymer ion exchange membrane interposed between said anode electrode and said cathode electrode, said plurality of fuel cell units being stacked in a stacking direction with separators disposed therebetween, each of the fuel cell units having a rectangular shape having a first side, a second side, a third side and a fourth side, the first side and the second side being opposite to each other and having a first length, the third and fourth side being opposite to each other and having a second length longer than the first length;
an oxygen-containing gas supply and discharge passage extending through said plurality of fuel cell units for supplying an oxygen-containing gas to said plurality of fuel cell units through said oxygen-containing gas supply and discharge passage;
a supply port for the oxygen-containing gas supply and discharge passage formed at an upper portion of the first side of the plurality of fuel cell units;
a discharge port for the oxygen-containing gas supply and discharge passage formed at a lower portion of the second side of the plurality of fuel cell units; and
a plurality of oxygen-containing gas flow passages connecting said supply port and said discharge port, said oxygen-containing gas flow passages being serpentine passages having only four turns along an entire length of the passage, each turn changing a direction of the oxygen-containing gas flow,
wherein each of the oxygen-containing gas supply port and the oxygen-containing gas discharge port has a port shape elongated in a gravity direction extending parallel to the first and the second sides.

21. The fuel cell stack of claim 20, wherein the discharge port and the supply port are formed at diagonally opposite portions of said plurality of fuel cell units.

22. The fuel cell stack of claim 20, further comprising a fuel gas supply and discharge passage extending through said plurality of fuel cell units for supplying a fuel gas to said plurality of fuel cell units through said fuel gas supply and discharge passage.

23. The fuel cell stack of claim 22, further comprising a supply port for the fuel gas supply and discharge passage formed in an upper portion of the plurality of fuel cell units.

24. The fuel cell stack of claim 22, further comprising a discharge port for the fuel gas supply and discharge passage formed in a lower portion of the plurality of fuel cell units.

* * * * *